US011249635B2

(12) United States Patent
Ye

(10) Patent No.: US 11,249,635 B2
(45) Date of Patent: Feb. 15, 2022

(54) FILE SHARING METHOD AND TERMINAL

(71) Applicant: Huawei Technologies Co., Ltd., Shenzhen (CN)

(72) Inventor: Fei Ye, Wuhan (CN)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

(21) Appl. No.: 16/754,549

(22) PCT Filed: Jan. 16, 2018

(86) PCT No.: PCT/CN2018/072894
§ 371 (c)(1),
(2) Date: Apr. 8, 2020

(87) PCT Pub. No.: WO2019/071872
PCT Pub. Date: Apr. 18, 2019

(65) Prior Publication Data
US 2020/0257425 A1    Aug. 13, 2020

(30) Foreign Application Priority Data
Oct. 9, 2017 (CN) .......................... 201710931371.5

(51) Int. Cl.
G06F 3/048 (2013.01)
G06F 3/0486 (2013.01)
G06F 3/0488 (2022.01)
H04L 29/08 (2006.01)
H04W 88/02 (2009.01)

(52) U.S. Cl.
CPC ........ *G06F 3/0486* (2013.01); *G06F 3/04883* (2013.01); *H04L 67/06* (2013.01); *H04W 88/02* (2013.01)

(58) Field of Classification Search
None
See application file for complete search history.

(56) References Cited

U.S. PATENT DOCUMENTS 8,788,947 B2 * 7/2014 Putz ...................... G06F 3/0481
715/748
10,019,133 B1 * 7/2018 McNeill ................ G06F 3/0488
10,324,614 B2 * 6/2019 Agrawal ................ H04L 67/06
(Continued)

FOREIGN PATENT DOCUMENTS

CN          104769916 A    7/2015
CN          105224185 A    1/2016
(Continued)

*Primary Examiner* — Hua Lu
(74) *Attorney, Agent, or Firm* — Slater Matsil, LLP

(57) ABSTRACT

A file sharing method is provided, which includes: displaying, by a terminal, a first screen that includes a to-be-shared file; displaying, by the terminal, at least one sharing peer of the to-be-shared file in a preset area in response to detecting that the to-be-shared file is moved into the preset area on the first screen, where the sharing peer includes an icon of a device or a user that is to receive the to-be-shared file; and sending, by the terminal, the to-be-shared file to a target sharing peer in response to detecting that the to-be-shared file is moved into a hot zone of the target sharing peer, where the target sharing peer is one of the at least one sharing peer.

17 Claims, 23 Drawing Sheets

(56) References Cited

U.S. PATENT DOCUMENTS

| | | | | |
|---|---|---|---|---|
| 2006/0136828 A1* | 6/2006 | Asano | G06F 9/54 | 715/733 |
| 2010/0251177 A1* | 9/2010 | Geppert | H04M 1/247 | 715/821 |
| 2011/0205435 A1* | 8/2011 | Lee | H04N 5/44543 | 348/563 |
| 2011/0225539 A1* | 9/2011 | Lee | G06F 3/0486 | 715/784 |
| 2014/0040803 A1* | 2/2014 | Briand | G06F 3/0486 | 715/769 |
| 2014/0096048 A1* | 4/2014 | Rottler | G06F 3/0486 | 715/769 |
| 2014/0122644 A1* | 5/2014 | Kuscher | H04L 67/06 | 709/217 |
| 2015/0011247 A1* | 1/2015 | Ezra | H04W 64/00 | 455/456.3 |
| 2015/0177954 A1* | 6/2015 | Wei | G06F 3/04817 | 715/738 |
| 2015/0236922 A1* | 8/2015 | Xiong | H04M 1/72406 | 715/748 |
| 2016/0028796 A1* | 1/2016 | Garcia | H04L 67/1095 | 715/738 |
| 2016/0231888 A1* | 8/2016 | Govindraj | G06F 3/0485 | |
| 2016/0253083 A1* | 9/2016 | Lee | H04L 51/043 | 715/771 |
| 2017/0017355 A1* | 1/2017 | Lim | G06F 3/0488 | |
| 2017/0102852 A1* | 4/2017 | Agrawal | G06F 3/04842 | |
| 2017/0139557 A1* | 5/2017 | Heo | G06F 3/04817 | |
| 2017/0289235 A1* | 10/2017 | Mattox, Jr. | H04L 43/06 | |

FOREIGN PATENT DOCUMENTS

| | | |
|---|---|---|
| CN | 106161518 A | 11/2016 |
| CN | 106489126 A | 3/2017 |
| CN | 106527882 A | 3/2017 |
| CN | 106598462 A | 4/2017 |
| CN | 107229389 A | 10/2017 |

* cited by examiner (a)

(b)

FILE SHARING METHOD AND TERMINAL

CROSS-REFERENCE TO RELATED APPLICATIONS

This application is a national stage of International Application No. PCT/CN2018/072894, filed on Jan. 16, 2018, which claims priority to Chinese Patent Application No. 201710931371.5, filed on Oct. 9, 2017. Both of the aforementioned applications are hereby incorporated by reference in their entireties.

TECHNICAL FIELD

Embodiments of this application relate to the field of communications technologies, and in particular, to a file sharing method and a terminal.

BACKGROUND

Currently, many terminals (such as mobile phones and tablet computers) support sharing files (such as applications, documents, pictures, and audio) to other devices or users.

When two terminals share files by using a wireless transmission mode such as Bluetooth, wireless fidelity (Wi-Fi), or a third-party application, as shown in FIG. 1A and FIG. 1B, a user needs to first select a to-be-shared file (for example, a picture 11 in FIG. 1A and FIG. 1B), and tap a "Share" button 12 to trigger a terminal to display available sharing modes, such as Bluetooth, E-mail, and SMS. If the user selects "Bluetooth" as a sharing mode, the terminal may search for and display Bluetooth-enabled candidate devices around. Then, the user selects one device from the candidate devices as a sharing peer and transmits the picture 11, thereby implementing file sharing between the two terminals.

Obviously, operations of the foregoing file sharing process are highly cumbersome. The user needs to switch between a plurality of screens and complete a plurality of selections before the to-be-shared file is transmitted to the sharing peer. Consequently, file sharing efficiency between the terminals is reduced.

SUMMARY

Embodiments of this application provide a file sharing method and a terminal, so as to simplify user operations in a process of sharing a file across terminals, and improve file sharing efficiency between terminals.

To achieve this objective, the following technical solutions are used in the embodiments of this application.

According to a first aspect, an embodiment of this application provides a file sharing method, including: displaying, by a terminal, a first screen that includes a to-be-shared file; displaying, by the terminal, at least one sharing peer of the to-be-shared file in a preset area in response to detecting that the to-be-shared file is moved into the preset area on the first screen, where the sharing peer includes an icon of a device or a user that is to receive the to-be-shared file; and sending, by the terminal, the to-be-shared file to a target sharing peer in response to detecting that the to-be-shared file is moved into a hot zone of the target sharing peer, where the target sharing peer is one of the at least one sharing peer.

It can be seen that, the terminal may identify a sharing intention of a user by a location of the to-be-shared file, and then display the candidate sharing peer on the first screen that includes the to-be-shared file to help the user to select the sharing peer. In this way, when sharing a file, the terminal does not need to switch to or show a new screen to interrupt an operation being performed by the user, nor continue to occupy display space on the current screen to cause occlusion, thereby improving file sharing efficiency between terminals and user experience.

In a possible design method, after the terminal displays the first screen that includes the to-be-shared file, the method further includes: receiving, by the terminal, a first gesture that the user drags the to-be-shared file to move to the preset area; and after the terminal displays the at least one sharing peer of the to-be-shared file in the preset area, the method further includes: receiving, by the terminal, a second gesture that the user drags the to-be-shared file to move to a hot zone of the target sharing peer; where the first gesture and the second gesture are two stages of one continuous gesture. In other words, the user may complete a series of operations including selecting a to-be-shared file, selecting a sharing peer, and transmitting the to-be-shared file with a continuous drag operation, thereby implementing the function of sharing a file in one step.

In a possible design method, after the terminal receives the first gesture that the user drags the to-be-shared file to move to the preset area, the method further includes: prompting, by the terminal, the user a location of the preset area on the first screen, to help the user to drag the to-be-shared file to the preset area to trigger a file sharing process.

For example, the terminal may prompt the user the location of the preset area on the first screen by displaying a boundary line of the preset area.

In a possible design method, in response to detecting that the to-be-shared file is moved into the preset area on the first screen, the method further includes: using, by the terminal, an icon of at least one terminal found by searching as the sharing peer, and/or selecting, by the terminal, an icon of at least one contact that has been recently contacted as the sharing peer. To be specific, moving the to-be-shared file into the preset area on the first screen may trigger the terminal to automatically determine the related device and/or contact as the sharing peer.

In a possible design method, the sending, by the terminal, the to-be-shared file to a target sharing peer in response to detecting that the to-be-shared file is moved into a hot zone of the target sharing peer specifically includes: displaying, by the terminal, at least one candidate transmission mode that supports sharing of the to-be-shared file, in response to detecting that the to-be-shared file is moved into the hot zone of the target sharing peer; and sending, by the terminal, the to-be-shared file to the target sharing peer by using a target transmission mode, in response to detecting that the to-be-shared file is moved into a hot zone of the target transmission mode, where the target transmission mode is one of the at least one candidate transmission mode. That is, the terminal may automatically provide, based on the location of the to-be-shared file, the user with available transmission modes for the user to select.

In a possible design method, after the terminal displays the at least one candidate transmission mode that supports sharing of the to-be-shared file, the method further includes: receiving, by the terminal, a third gesture that the user drags the to-be-shared file to move to the hot zone of the target transmission mode, where the third gesture, the first gesture, and the second gesture are three stages of one continuous gesture. In this way, a user's finger does not need to leave a touchscreen, and the terminal does not need to switch to or show the new screen, to complete a series of operations including selecting a to-be-shared file, selecting a sharing peer, selecting a transmission mode, and transmitting the to-be-shared file on the terminal, thereby implementing the function of file sharing in one step.

In a possible design method, after the terminal sends the to-be-shared file to the target sharing peer, the method further includes: hiding, by the terminal, the preset area to restore the first screen, after the terminal successfully sends the to-be-shared file to the target sharing peer; or hiding, by the terminal, the preset area to restore the first screen, when receiving an operation entered by the user to cancel or suspend transmission, to prevent the preset area from occluding displayed content on the first screen for a long time.

In a possible design method, after the terminal displays the at least one sharing peer of the to-be-shared file in the preset area, the method further includes: hiding, by the terminal, the preset area to restore the first screen, in response to detecting that the user drags the to-be-shared file to leave the preset area; or hiding, by the terminal, the at least one sharing peer displayed in the preset area, in response to detecting that the user drags the to-be-shared file to leave the preset area, to prevent the preset area from occluding displayed content on the first screen for a long time.

In a possible design method, after the terminal sends the to-be-shared file to the target sharing peer, the method further includes: displaying, by the terminal, a transmission progress of sending the to-be-shared file to the target sharing peer.

In a possible design method, the method further includes: determining, by the terminal, a shape or a size of the preset area based on a start location of the to-be-shared file on the first screen.

According to a second aspect, an embodiment of this application provides a file sharing method, including: displaying, by a terminal, a first screen that includes a to-be-shared file; displaying, by the terminal, at least one candidate transmission mode of the to-be-shared file in a preset area in response to detecting that the to-be-shared file is moved into the preset area on the first screen; and sharing, by the terminal, the to-be-shared file by using a target transmission mode, in response to detecting that the to-be-shared file is moved into a hot zone of the target transmission mode, where the target transmission mode is one of the at least one candidate transmission mode.

In a possible design method, after the terminal displays the first screen that includes the to-be-shared file, the method further includes: receiving, by the terminal, a first gesture that a user drags the to-be-shared file to move to the preset area; after the terminal displays the at least one candidate transmission mode of the to-be-shared file in the preset area, the method further includes: receiving, by the terminal, a second gesture that the user drags the to-be-shared file to move to the hot zone of the target transmission mode; where the first gesture and the second gesture are two stages of one continuous gesture.

In a possible design method, in response to detecting that the to-be-shared file is moved into the hot zone of the target transmission mode, the method further includes: displaying, by the terminal, at least one sharing peer that supports using of the target transmission mode, where the sharing peer includes an icon of a device or a user that is to receive the to-be-shared file; and sending, by the terminal, the to-be-shared file to a target sharing peer by using the target transmission mode, in response to detecting that the to-be-shared file is moved into a hot zone of the target sharing peer, where the target sharing peer is one of the at least one sharing peer.

In a possible design method, after the terminal displays the at least one sharing peer that supports using of the target transmission mode, the method further includes: receiving, by the terminal, a third gesture that the user drags the to-be-shared file to move to the hot zone of the target sharing peer, where the third gesture, the first gesture, and the second gesture are three stages of one continuous gesture.

According to a second aspect, an embodiment of this application provides a file sharing method, including: displaying, by a terminal, a first screen that includes a to-be-shared file; receiving, by the terminal, a first gesture that a user drags the to-be-shared file to move to a preset area on the first screen; when the to-be-shared file is moved into the preset area, displaying, by the terminal, at least one sharing peer of the to-be-shared file in the preset area, where the sharing peer includes an icon of a device or a user that is to receive the to-be-shared file; receiving, by the terminal, a second gesture that the user drags the to-be-shared file to move to a hot zone of a target sharing peer, where the target sharing peer is one of the at least one sharing peer; when the to-be-shared file is moved into the hot zone of the target sharing peer, displaying, by the terminal, at least one candidate transmission mode that supports sharing of the to-be-shared file; receiving, by the terminal, a third gesture that the user drags the to-be-shared file to move to a hot zone of a target transmission mode, where the target transmission mode is one of the at least one candidate transmission mode; when the to-be-shared file is moved into the hot zone of the target transmission mode, sending, by the terminal, the to-be-shared file to the target sharing peer by using the target transmission mode; and after the terminal successfully sends the to-be-shared file to the target sharing peer, hiding, by the terminal, the preset area to restore the first screen.

According to a third aspect, an embodiment of this application provides a terminal, including: a display unit, configured to display a first screen that includes a to-be-shared file; a detection unit, configured to: detect that the to-be-shared file is moved into a preset area on the first screen; and detect that the to-be-shared file is moved into a hot zone of a target sharing peer, where the target sharing peer is one of the at least one sharing peer; the display unit is further configured to display the at least one sharing peer of the to-be-shared file in the preset area when the to-be-shared file is moved into the preset area on the first screen, where the sharing peer includes an icon of a device or a user that is to receive the to-be-shared file; and the transmission unit, configured to send the to-be-shared file to the target sharing peer when the to-be-shared file is moved into the hot zone of the target sharing peer.

In a possible design method, the terminal further includes: an input unit, configured to: receive a first gesture that a user drags the to-be-shared file to move to the preset area; and receive a second gesture that the user drags the to-be-shared file to move to the hot zone of the target sharing peer, where the first gesture and the second gesture are two stages of one continuous gesture.

In a possible design method, the display unit is further configured to prompt the user a location of the preset area on the first screen by displaying a boundary line of the preset area.

In a possible design method, the terminal further includes: a processing unit, configured to: use an icon of at least one terminal found by searching as the sharing peer; and/or use an icon of at least one contact that has been recently contacted as the sharing peer.

In a possible design method, the display unit is further configured to display at least one candidate transmission mode that supports sharing of the to-be-shared file, when the to-be-shared file is moved into the hot zone of the target sharing peer; the detection unit is further configured to detect that the to-be-shared file is moved into a hot zone of the target transmission mode, where the target transmission mode is one of the at least one candidate transmission mode; and the transmission unit is specifically configured to send the to-be-shared file to the target sharing peer by using the target transmission mode, when the to-be-shared file is moved into the hot zone of the target transmission mode.

In a possible design method, the input unit is further configured to receive a third gesture that the user drags the to-be-shared file to move to the hot zone of the target transmission mode, where the third gesture, the first gesture, and the second gesture are three stages of one continuous gesture.

In a possible design method, the processing unit is further configured to: instruct the display unit to hide the preset area to restore the first screen, after the terminal successfully sends the to-be-shared file to the target sharing peer; or instruct the display unit to hide the preset area to restore the first screen, when receiving an operation entered by the user to cancel or suspend transmission.

In a possible design method, the detection unit is further configured to detect that the user drags the to-be-shared file to leave the preset area; and the processing unit is further configured to instruct the display unit to hide the preset area to restore the first screen, when it is detected that the user drags the to-be-shared file to leave the preset area or it is detected that the user drags the to-be-shared file to leave the preset area.

In a possible design method, the display unit is further configured to display a transmission progress of sending the to-be-shared file to the target sharing peer.

In a possible design method, the processing unit is further configured to determine a shape or a size of the preset area based on a start location of the to-be-shared file on the first screen.

According to a fourth aspect, an embodiment of this application provides a terminal, including: a display unit, configured to display a first screen that includes a to-be-shared file; a detection unit, configured to: detect that the to-be-shared file is moved into a preset area on the first screen; and detect that the to-be-shared file is moved into a hot zone of a target transmission mode, where the target transmission mode is one of the at least one candidate transmission mode; the display unit is further configured to display the at least one candidate transmission mode of the to-be-shared file in the preset area when the to-be-shared file is moved into the preset area on the first screen; and the transmission unit, configured to share the to-be-shared file by using the target transmission mode, when the to-be-shared file is moved into the hot zone of the target transmission mode.

In a possible design method, the terminal further includes: an input unit, configured to: receive a first gesture that a user drags the to-be-shared file to move to the preset area; and receive a second gesture that the user drags the to-be-shared file to move to the hot zone of the target transmission mode, where the first gesture and the second gesture are two stages of one continuous gesture.

In a possible design method, the display unit is further configured to display at least one sharing peer that supports using of the target transmission mode, where the sharing peer includes an icon of a device or a user that is to receive the to-be-shared file; the detection unit is further configured to detect that the to-be-shared file is moved into a hot zone of a target sharing peer, where the target sharing peer is one of the at least one sharing peer; and the transmission unit is specifically configured to send the to-be-shared file to the target sharing peer by using the target transmission mode, when the to-be-shared file is moved into the hot zone of the target sharing peer.

In a possible design method, the input unit is further configured to receive a third gesture that the user drags the to-be-shared file to move to the hot zone of the target sharing peer, where the third gesture, the first gesture, and the second gesture are three stages of one continuous gesture.

According to a fifth aspect, an embodiment of this application provides a terminal, including: a processor, a memory, a bus, and a communications interface; where the memory is configured to store a computer-executable instruction, and the processor is connected to the memory through the bus; and when the terminal is running, the processor executes the computer-executable instruction stored in the memory to enable the terminal to perform any one of the foregoing file sharing method.

According to a fourth aspect, an embodiment of this application provides a computer-readable storage medium, where the computer-readable storage medium stores an instruction, and when the instruction is run on any one of the foregoing terminals, the terminal is enabled to perform any one of the foregoing file sharing methods.

According to a fifth aspect, an embodiment of this application provides a chip, including: a processor and a memory; where the memory is configured to store a computer-executable instruction, and the processor is connected to the memory; and when the chip is running, the processor executes the computer-executable instruction stored in the memory to enable the chip to perform any one of the foregoing file sharing methods.

According to a sixth aspect, an embodiment of this application provides a computer program product that includes an instruction, where when the computer program product is run on any one of the foregoing terminals, the terminal is enabled to perform any one of the foregoing file sharing methods.

In the embodiments of this application, the names of the components of the foregoing terminal do not constitute any limitation on the device. In actual implementation, the components may appear with other names. Provided that functions of the various components are similar to those in the embodiments of this application, the components fall within the scope defined by the claims of this application and their equivalent technologies.

In addition, for technical effects brought by the design methods of any one of the second aspect to the sixth aspect, refer to the technical effects brought by different design methods in the first aspect. Details are not described herein again.

DETAILED DESCRIPTION OF ILLUSTRATIVE EMBODIMENTS

The terms "first" and "second" mentioned below are merely intended for a purpose of description, and shall not be understood as an indication or implication of relative importance or implicit indication of the number of indicated technical features. Therefore, a feature limited by "first" or "second" may explicitly or implicitly include one or more features. In the description of the embodiments of this application, unless otherwise stated, "a plurality of" means two or more.

A file sharing method provided in the embodiments of this application can be applied to a mobile phone, a tablet computer, a wearable device, a vehicle-mounted device, an augmented reality (augmented reality, AR) device, a virtual reality (virtual reality, VR) device, a notebook computer, an ultra-mobile personal computer (ultra-mobile personal computer, UMPC), a netbook, a personal digital assistant (personal digital assistant, PDA) or any terminal with a file sharing function. The embodiments of this application do not impose any limitation on this.

Figure 1A:
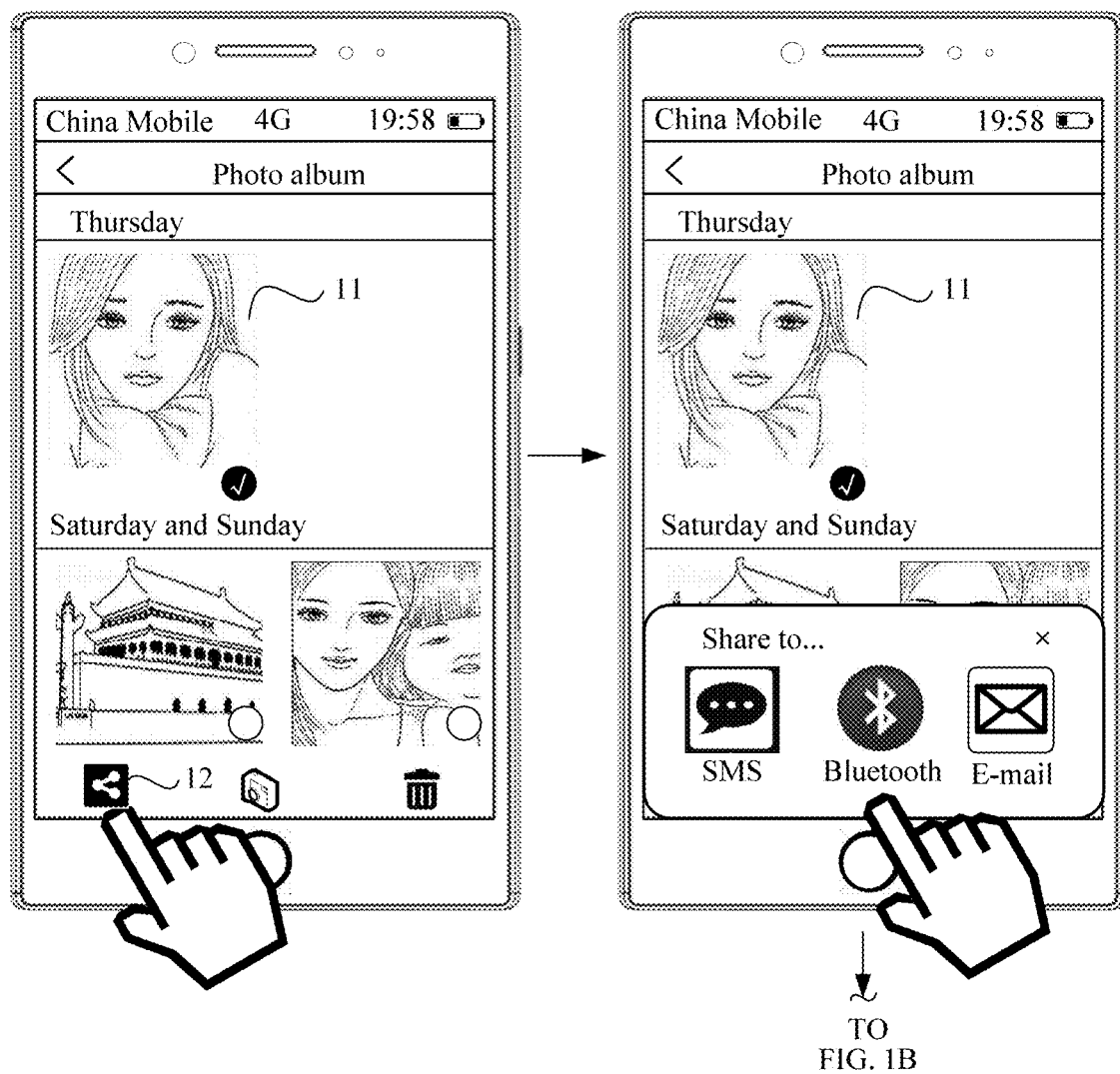
FIG. 1A and FIG. 1B are a schematic diagram of an application scenario of sharing a file in the prior art.
Figure 1B:
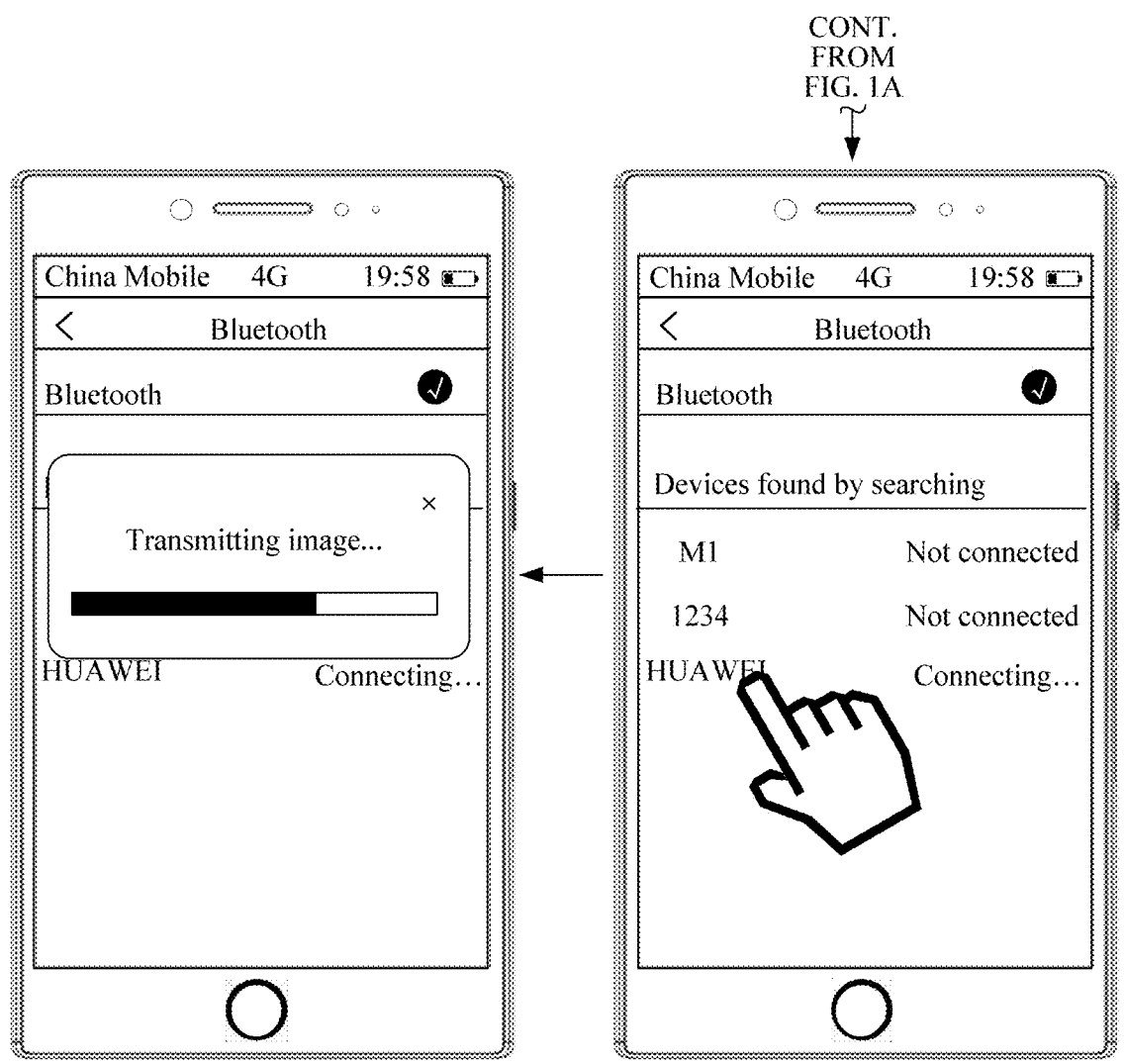
Figure 2:
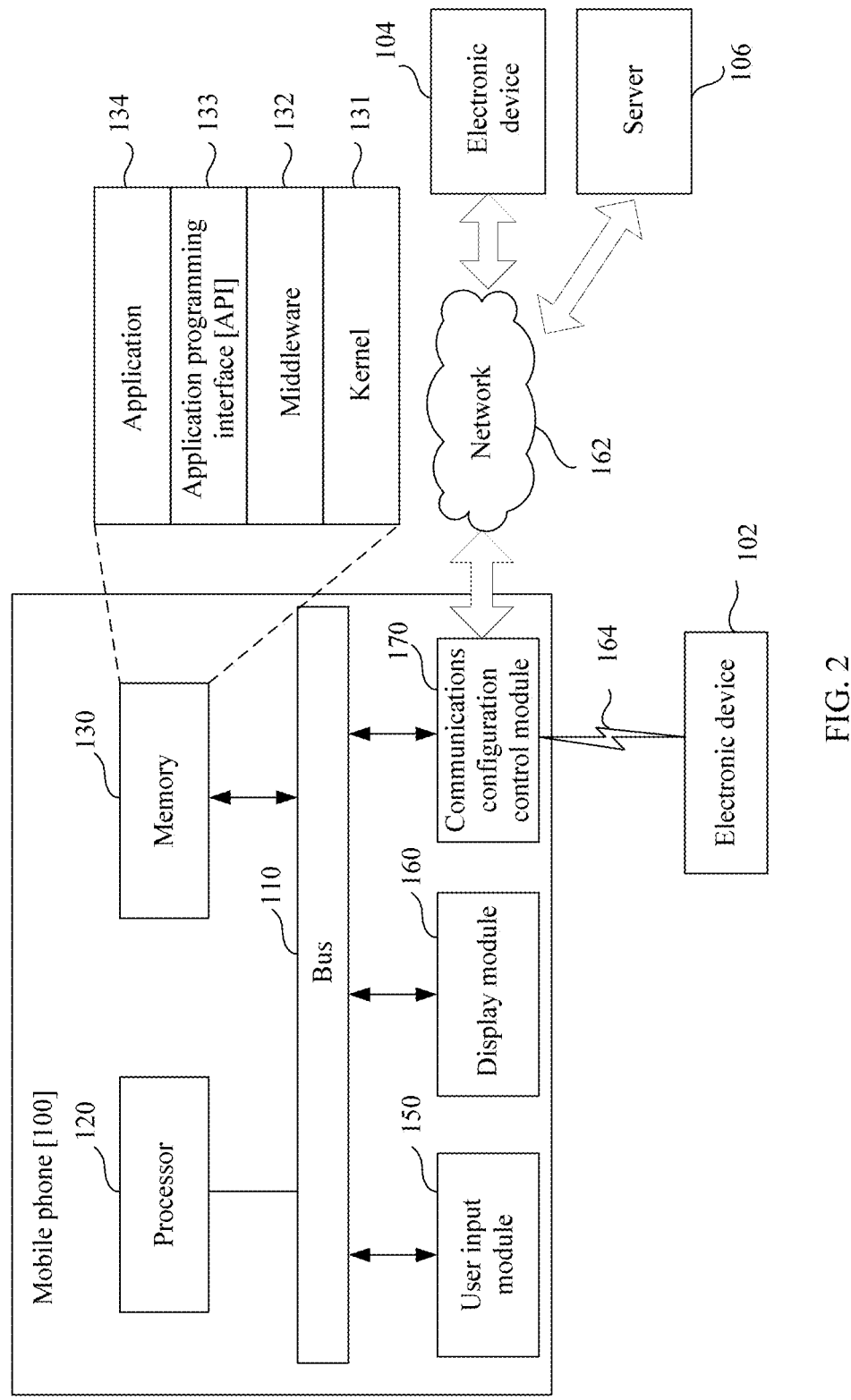
FIG. 2 is a schematic structural diagram 1 of a terminal according to an embodiment of this application.

As shown in FIG. 2, the terminal in the embodiments of this application may be a mobile phone 100. The following uses the mobile phone 100 as an example to specifically describe the embodiments. It should be understood that, the illustrated mobile phone 100 is merely one example of the foregoing terminal, and the mobile phone 100 may have more or fewer components than those shown in FIG. 2, may combine two or more components, or may have different component configurations.

With reference to FIG. 2, the mobile phone 100 may communicate with electronic devices 102 and 104 other than the mobile phone 100, and a server 106. The mobile phone 100 may include a bus 110, a processor 120, a memory 130, a user input module 150, a display module 160, a communications interface 170, and other similar and/or suitable components.

The bus no may be an electric circuitry that interconnects the foregoing components and transfers communication information (such as control messages) between the components.

Through the bus 110, the processor 120 may receive commands from the foregoing other components (such as the memory 130, the user input module 150, the display module 160, and the communications configuration control module 170), may interpret the received commands, and perform calculation or data processing according to the interpreted commands.

The memory 130 may store commands or data received from the processor 120 or other components (such as the user input module 150, the display module 160, and the communications interface 170), or commands or data generated by the processor 120 or other components.

The memory 130 may include programming modules, such as a kernel 131, middleware 132, an application programming interface (API) 133, and an application 134. Each of the foregoing programming modules may be implemented by using software, firmware, hardware, or a combination of two or more thereof. For detailed description thereof, refer to related description of FIG. 3.

The kernel 131 may control or manage system resources (such as the bus 110, the processor 120, and the memory 130) for performing operations or functions implemented by other programming modules (such as the middleware 132, the API 133, and the application 134). In addition, the kernel 131 may provide an interface capable of accessing and controlling or managing the various components of the mobile phone 100 by using the middleware 132, the API 133 or the application 134.

The middleware 132 may be configured to run between the API 133 or the application 134 and the kernel 131 in a way of communication and data exchange between the API 133 or the application 134 and the kernel 131. For example, the middleware 132 may be configured as an intermediary for communication between the API 133 or the application 134 and the kernel 131. In addition, for example, regarding work requests received from one or more applications 134 and/or the middleware 132, a priority may be assigned to at least one of the one or more applications 134 (where the system resources of the mobile phone 100 (such as the bus 110, the processor 120, and the memory 130) may be used according to the priority) to perform load balancing of the work requests.

The API 133 is an interface by which the application 134 may control functions provided by the kernel 131 or the middleware 132, and may include, for example, at least one interface or function for file control, window control, image processing, character control, and the like.

The application 134 may include, for example, a home screen application, a dialer application, a short message service (SMS)/multimedia message service (MMS) application, an instant message (IM) application, a browser application, a camera application, an alarm clock application, a contacts application, a voice dialing application, an E-mail (e-mail) application, a calendar application, a media player application, a photo album application, a clock application, and any other suitable and/or similar applications.

The user input module 150 may receive commands or data entered from a user through input-output methods (such as a sensor, a keyboard, or a touchscreen), and may send the received commands or data to the processor 120 or the memory 130 through the bus 110. The display module 160 may display videos, images, data and the like to the user.

The display module 160 may display various information (such as multimedia data, or text data) received from the foregoing components.

The communications interface 170 may control short-range communication connections with the another electronic device 102. When the mobile phone 100 is paired with another electronic device, the communications interface 170 may stop a scanning operation for receiving a signal from an adjacent electronic device or stop a broadcast operation of broadcasting a signal. For example, in response to the mobile phone 100 being paired with the another electronic device 102, the communications interface 170 stops a scanning operation for receiving a signal from an adjacent electronic device or stops a broadcast operation of broadcasting a signal. When the mobile phone 100 is paired with another electronic device, the communications interface 170 may control a cycle of the scanning or the broadcast operation.

According to the embodiments disclosed in this application, the mobile phone 100 may communicate with another electronic device by using the communications interface 170. For example, the communications interface 170 may communicate with the another electronic device 104, the server 106, and the like. The communications interface 170 may communicate with the another electronic device 104, the server 106, and the like directly or through a network 162. For example, the communications interface 170 may be operated to connect the mobile phone 100 to the network 162.

Figure 3:
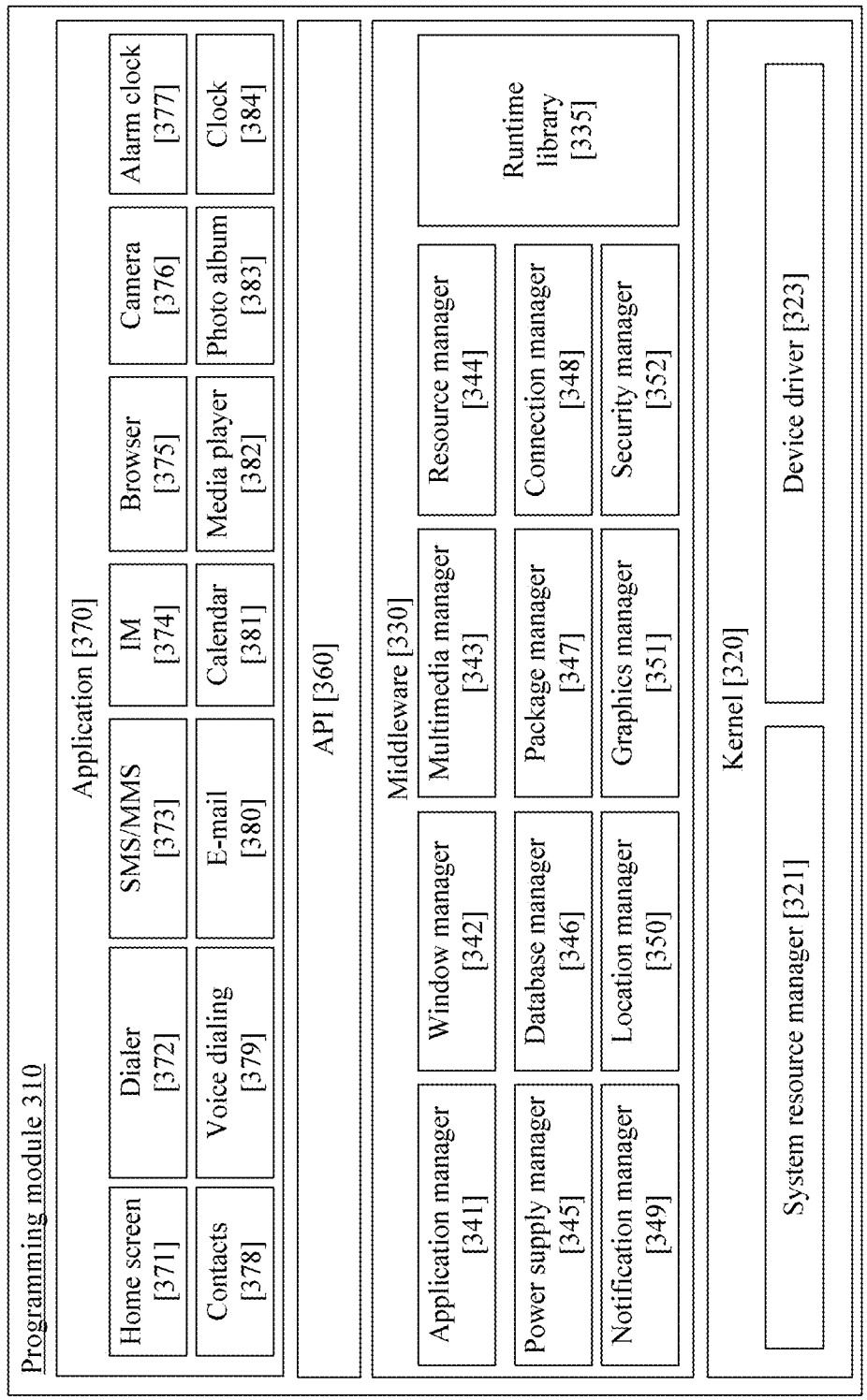
FIG. 3 is a schematic structural diagram of a programming module in a terminal according to an embodiment of this application.

FIG. 3 shows a block diagram of a configuration of a programming module disclosed in accordance with an embodiment of this application.

With reference to FIG. 3, the programming module 310 may be included (or stored) in the mobile phone 100 (such as the memory 130) shown in FIG. 2. At least a portion of the programming module 310 may be implemented as software, firmware, hardware, or a combination of two or more thereof. The programming module 310 may be implemented as hardware (such as hardware 201), and may include an OS that controls resources associated with an electronic device (such as the mobile phone 100) and/or various applications (such as an application 370) that are executed in the OS. For example, the OS may be Android, iOS, Windows, Symbian, Tizen, Bada, or the like.

With reference to FIG. 3, the programming module 310 may include a kernel 320, middleware 330, an API 360, and/or an application 370.

The kernel 320 (such as the kernel 131) may include a system resource manager 321 and/or a device driver 323.

The system resource manager 321 may include a process manager (not shown), a memory manager (not shown), and a file system manager (not shown). The system resource manager 321 may perform operations such as control, allocation, or recovery on the system resources. The device driver 323 may include, for example, a display driver (not shown), a camera driver (not shown), a Bluetooth driver (not shown), a shared memory driver (not shown), a USB driver (not shown), a keypad driver (not shown), a Wi-Fi driver (not shown), and/or an audio driver (not shown). In addition, according to the embodiments disclosed in this application, the device driver 323 may include an interprocess communication (IPC) driver (not shown).

The middleware 330 may include a plurality of modules that are implemented in advance, to provide functions shared by the application 370. In addition, the middleware 330 may provide functionality to the application 370 through the API 360, to enable the application 370 to efficiently utilize limited system resources within the electronic device. For example, as shown in FIG. 3, the middleware 330 (such as the middleware 132) may include at least one of the following: a runtime library 335, an application manager 341, a window manager 342, a multimedia manager 343, a resource manager 344, a power supply manager 345, a database manager 346, a package manager 347, a connection manager 348, a notification manager 349, a location manager 350, a graphics manager 351, a security manager 352, and any other suitable and/or similar managers.

The runtime library 335 may include, for example, a library module used by a compiler, to add new functionality by using a programming language during execution of the application 370. According to the embodiments disclosed in this application, the runtime library 335 may perform functions related to input and output, memory management, arithmetic functions, and the like.

The application manager 341 may manage, for example, a life cycle of at least one application 370. The window manager 342 may manage graphical user interface (GUI) resources used on a screen. The multimedia manager 343 may detect a format used to reproduce various media files, and may encode or decode the media file by using a codec suitable for the relevant format. The resource manager 344 may manage resources of the at least one application 370, such as source code, a memory, and memory space.

The power supply manager 345 may operate with a basic input/output system (BIOS), may manage a battery or power source, and may provide power supply information for operation and the like. The database manager 346 may manage a database in a manner that enables generation, searching, and/or changing of a database to be used by the at least one application 370. The package manager 347 may manage the installation and/or update of applications distributed in a form of package files.

The connection manager 348 may manage wireless connections such as Wi-Fi and BT. The notification manager 349 may display or report events such as an arrival message, an appointment, and a proximity alert, to the user in a manner that does not bother a user. The location manager 350 may manage location information of the electronic device. The graphics manager 351 may manage graphics effects to be provided to the user and/or UIs related to the graphics effects. The security manager 352 may provide various security functions for system security, user authentication, and the like. According to the embodiments disclosed in this application, when the electronic device (such as the mobile phone 100) has a calling function, the middleware 330 may further include a calling manager (not shown) for managing a voice phone call function and/or a video call function of the electronic device.

The middleware 330 may generate and use a new middleware module based on various function combinations of the foregoing internal component modules. The middleware 330 may provide specialized modules according to the type of the OS to provide differentiated functions. The middleware 330 may also dynamically delete some of the existing components, or add new components. Accordingly, the middleware 330 may omit some of the elements described in the various embodiments disclosed in this application, and may include other elements, or some of these elements may be replaced with elements that perform similar functions but have different names.

The API 360 (such as the API 133) is a collection of API programming functions, and may have different configurations depending on the OS. In the case of, for example, Android or iOS, one API set may be provided to every platform. In the case of, for example, Tizen, two or more API sets may be provided to every platform.

The application 370 (such as the application 134 in FIG. 2) may include, for example, a preloaded application and/or a third-party application. The application 370 (such as the application 134) may include, for example, a home screen application 371, a dialing application 372, an SMS/MMS application 373, an IM application 374, a browser application 375, a camera application 376, an alarm clock application 377, a contacts application 378, a voice dialing application 379, an E-mail application 380, a calendar application 381, a media player application 382, a photo album application 383, a clock application 384, and any other suitable and/or similar applications.

In the embodiments of this application, the mobile phone 100 may send, to another terminal, at least one of a webpage link, a text, an image, a document, a folder, a video, audio, an installed application, or the like as a to-be-shared file, so as to implement a file sharing function between terminals.

Figure 4:
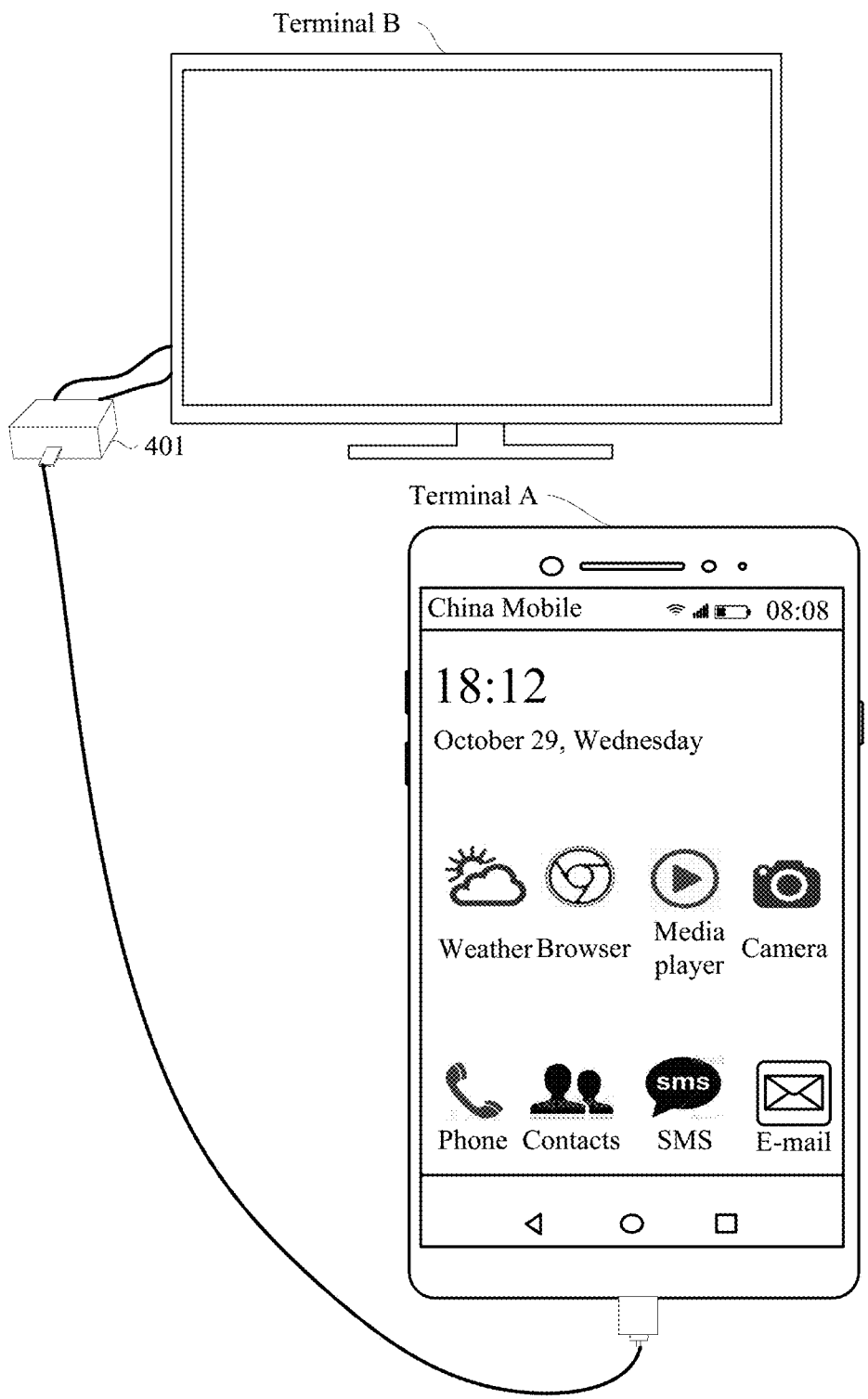
FIG. 4 is a schematic diagram 1 of an application scenario of a file sharing method according to an embodiment of this application.

Optionally, as shown in FIG. 4, when sharing a file, a terminal A may be connected to a sharing peer (a terminal B) through a switching device 401. Then, the terminal A may send the to-be-shared file to the terminal B based on the link.

The switching device 401 may be a universal serial bus (universal serial bus, USB) interface for plugging in a mobile phone data cable, or a mobile high-definition link (mobile high-definition link, MHL) device, or a dock device, or the like. The embodiments of this application do not impose any limitation on this.

Figure 5:
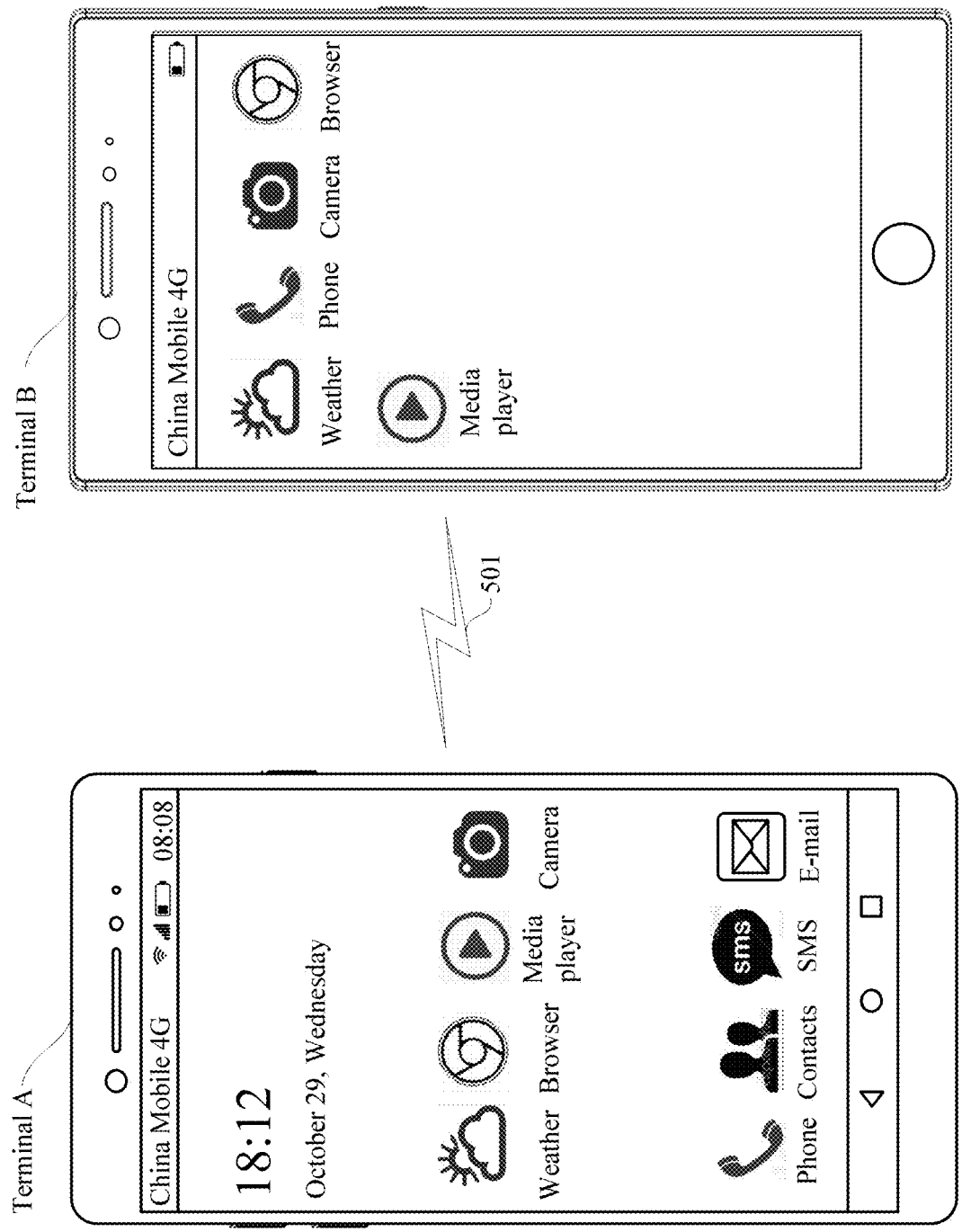
FIG. 5 is a schematic diagram 2 of an application scenario of a file sharing method according to an embodiment of this application.

Alternatively, as shown in FIG. 5, when sharing a file, a terminal A may be connected to a sharing peer (a terminal B) through a wireless connection 501, and then the terminal A may send the to-be-shared file to the terminal B through a wireless network.

The wireless connection 501 may be specifically a Bluetooth connection, a Wi-Fi connection, a wireless cellular network connection, a ZigBee (ZigBee) network connection, and the like. The embodiments of this application do not impose any limitation on this.

When the terminal A and the terminal B both have a Bluetooth function and a Wi-Fi function enabled, a file may be shared through a peer-to-peer (peer-to-peer, P2P) transmission mode. For example, when sharing a picture 1 with the terminal B, the terminal A may first search for the terminal B around by using a Bluetooth BLE (Bluetooth Low Energy, Bluetooth Low Energy) function, and then the terminal A and the terminal B may be connected through a wireless local area network (wireless local area network, WLAN) direct connection, so that based on the connection, the terminal A can quickly share the picture 1 with the terminal B without through a network.

Figure 6:
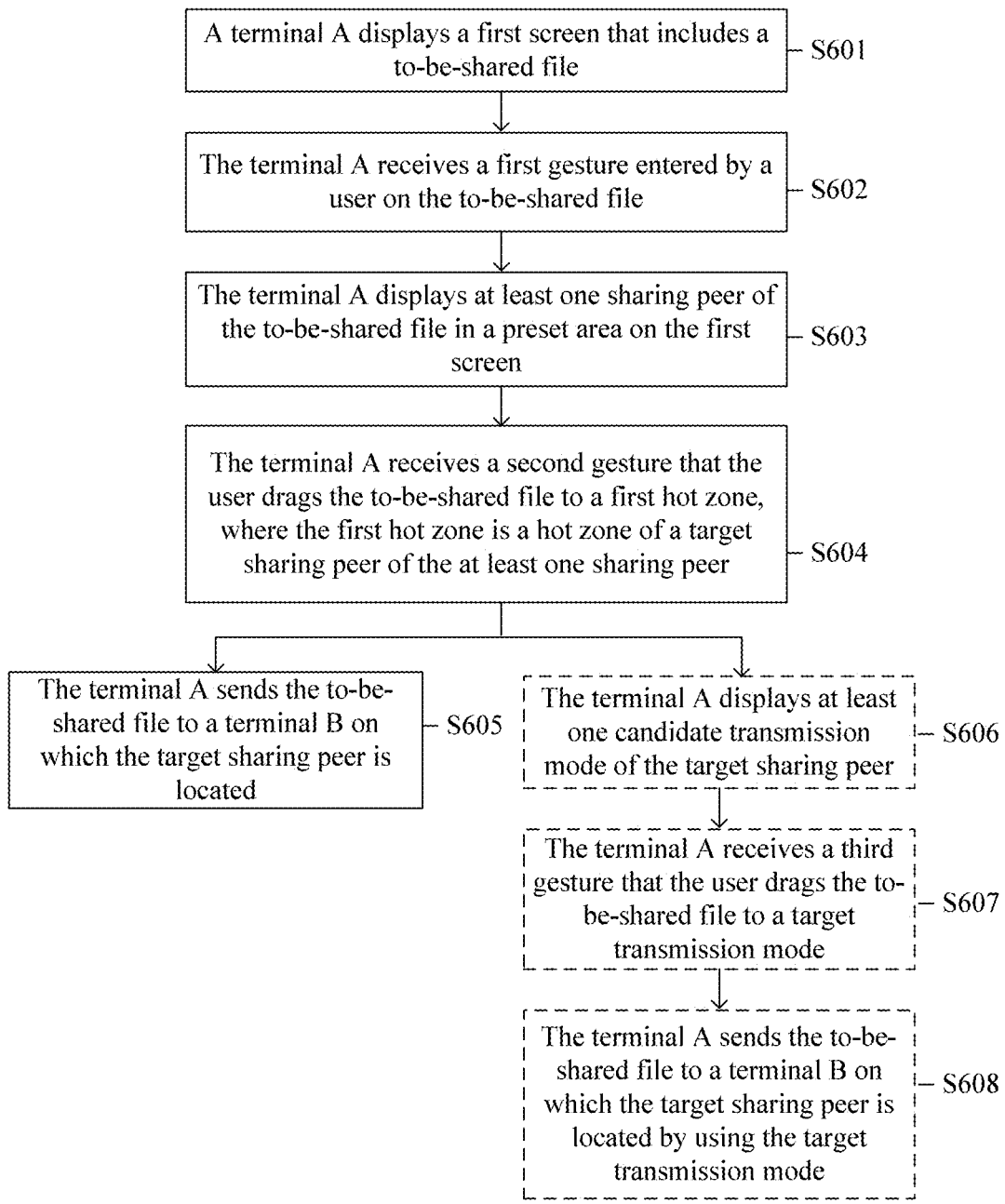
FIG. 6 is a schematic flowchart 1 of a file sharing method according to an embodiment of this application.

In the following embodiments, that the terminal A is connected to the terminal B through the wireless connection 501 is used as an example to describe in detail a file sharing method provided in the embodiments of this application. As shown in FIG. 6, the method includes the following steps.

S601. The terminal A displays a first screen that includes a to-be-shared file.

The to-be-shared file may be at least one of a text, a picture, a webpage link, a document, a video, audio, a folder, and an application. The foregoing first screen may be a desktop of the terminal A, or any interface in a target application that the terminal A is running. This embodiment of this application does not impose any limitation on this. In addition, an interface including a thumbnail or an icon of the to-be-shared file may also serve as the first screen that includes the to-be-shared file.

S602. The terminal A receives a first gesture entered by a user on the to-be-shared file.

S603. In response to the first gesture, the terminal A displays at least one sharing peer of the to-be-shared file in a preset area on the first screen, where the sharing peer is a device or a user that supports receiving of the to-be-shared file.

In steps S602-S603, when the user needs to share the to-be-shared file with another terminal, the user may enter a specific first gesture on the to-be-shared file on the first screen, and quickly trigger the terminal A to enable a file sharing function. At this point, in response to the first gesture, the terminal A may determine one or more sharing peers capable of receiving the to-be-shared file, and display the determined sharing peer in the preset area on the first screen.

Figure 7:
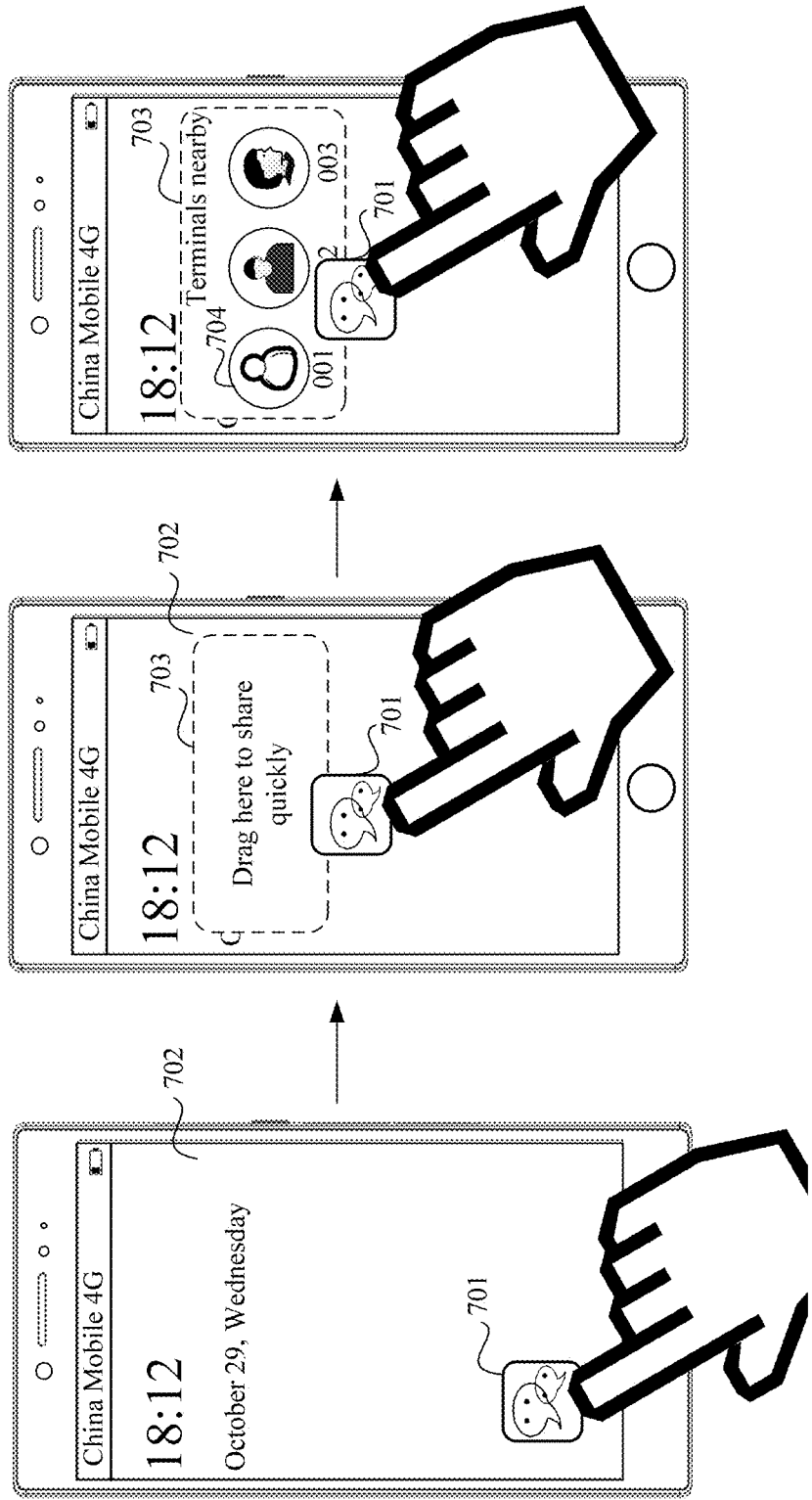
FIG. 7 is a schematic diagram 3 of an application scenario of a file sharing method according to an embodiment of this application.

For example, the foregoing first gesture may include a touch and hold gesture and a drag gesture. For example, supposing a WeChat application 701 is the to-be-shared file, as shown in FIG. 7, after the terminal A is unlocked, a desktop 702 is displayed, where the desktop 702 includes an icon of the installed WeChat application 701. Then, when it is detected that the user enters a press and hold gesture on the icon of the WeChat application 701, the terminal A may be triggered to display a preset sharing area 703 on the desktop 702. When it is detected that the user drags the icon of the WeChat application 701 to the sharing area 703, the terminal A may identify an intention of the user to share the WeChat application 701, and then trigger the terminal A to search for a nearby terminal by using Bluetooth or the like, and display the terminal found by searching as a sharing peer 704 in the sharing area 703 for the user to select.

Optionally, when the sharing peer 704 is displayed, a telephone number, a nickname, an avatar, a Bluetooth name, a device ID, and the like of the sharing peer 704 may be specifically displayed. This embodiment of this application does not impose any limitation on this.

Figure 8:
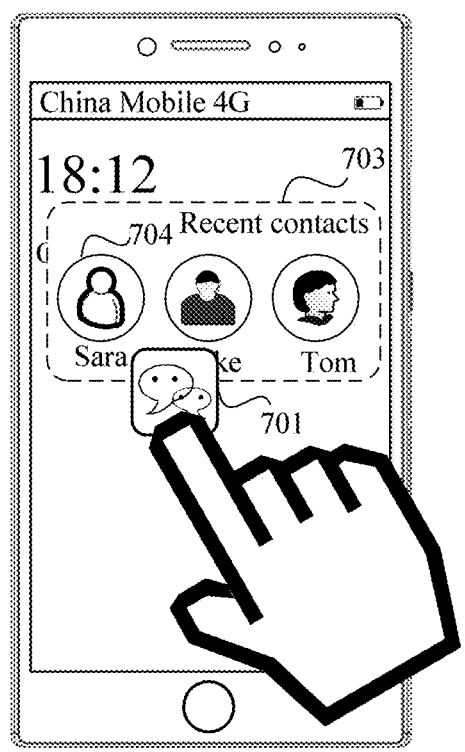
FIG. 8 is a schematic diagram 4 of an application scenario of a file sharing method according to an embodiment of this application.

Alternatively, when it is detected that the user drags the icon of the WeChat application 701 to the sharing area 703, the terminal A may obtain at least one contact or device frequently or recently contacted by the user, and display the contact or device in the sharing area 703 as the sharing peer 704. As shown in FIG. 8, the terminal A may determine, according to user's call records and chat records, that contacts that the user has recently contacted via WeChat, SMS, or telephone calls include Sara, Mike, and Tom. Then, the terminal A may display Sara, Mike, and Tom as three sharing peers 704 in the sharing area 703.

Certainly, the terminal may also display an "Others" option as a sharing peer in the sharing area 703. When the contact or device displayed by the terminal in the sharing area 703 for the user is not a desired contact or device of the user, the user may drag the to-be-shared file to the "Others" option and trigger the terminal to display an original sharing frame according to an existing file sharing process, and the user may manually select the sharing peer and/or a transmission mode to share the to-be-shared file. This embodiment of this application does not impose any limitation on this.

It can be seen that the terminal can identify the sharing intention of the user by the first gesture entered by the user on the to-be-shared file, and then display the candidate sharing peer in the preset area of the current screen. That is, when the user needs to share a to-be-shared file, the terminal may call the sharing peer on the current screen to help the user to select. In this way, when sharing a file, the terminal does not need to switch to or show a new screen to interrupt an operation being performed by the user, nor continue to occupy display space on the current screen to cause occlusion, thereby improving file sharing efficiency between terminals and user experience.

Further, when using the foregoing file sharing function, the terminal A may dynamically adjust a size and a location of the sharing area 703 based on one or more parameters such as a user's operating habit, a location of the to-be-shared file, and a position and time of a touch point in the first gesture.

For example, the WeChat application 701 is used again as the to-be-shared file. As shown in (a) of FIG. 9B, when the user enters a touch and hold gesture on the icon of the WeChat application 701, the terminal A may be triggered to display at the top of the desktop 702 two shortcut function keys of "Share 901" and "Uninstall 902", where the shortcut function key of "Share 901" is close to the left side of the desktop 702, and the shortcut function key of "Uninstall 902" is close to the right side of the desktop 702.

Figure 9A:
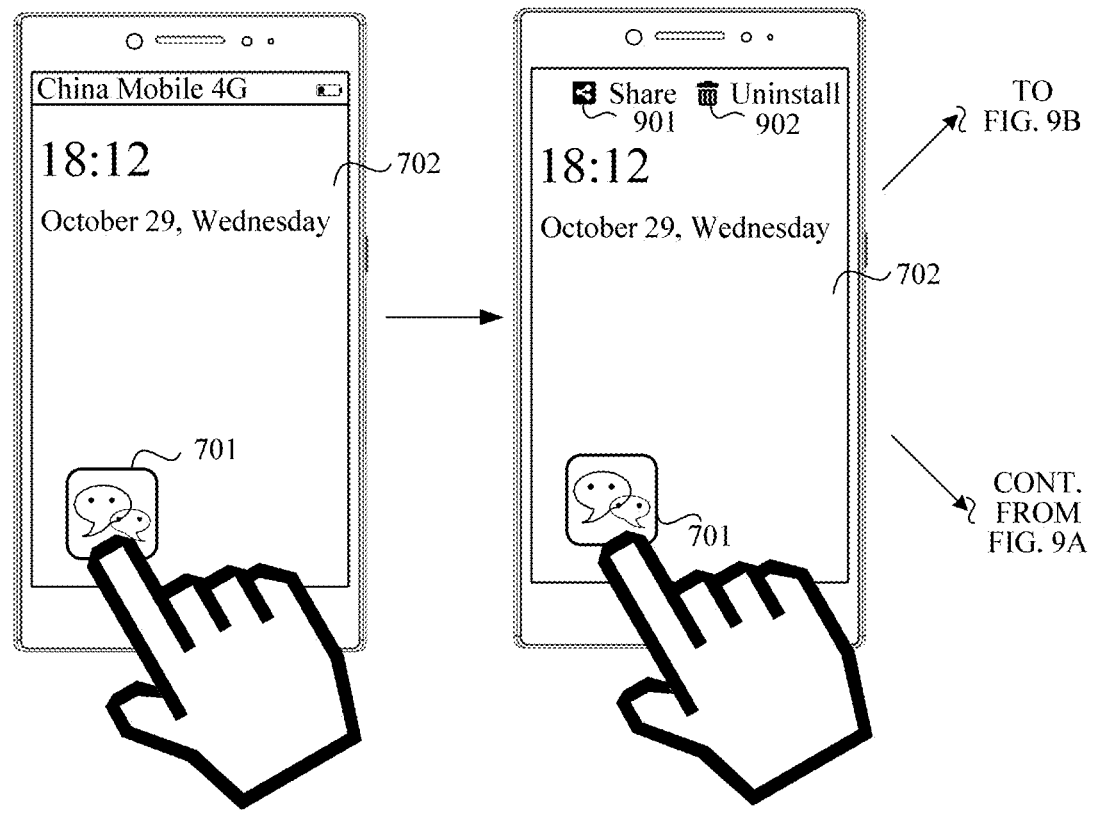
FIG. 9A and FIG. 9B are a schematic diagram 5 of an application scenario of a file sharing method according to an embodiment of this application.
Figure 9B:
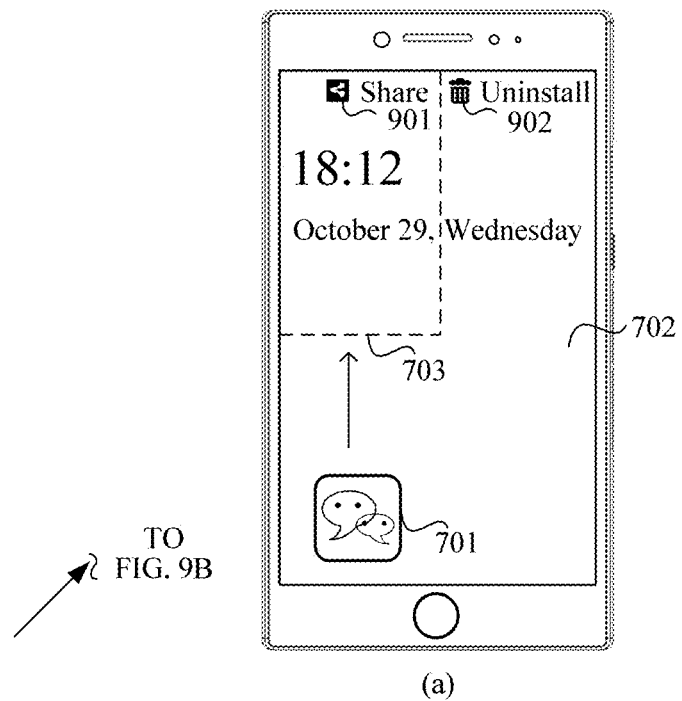
Figure 9B:
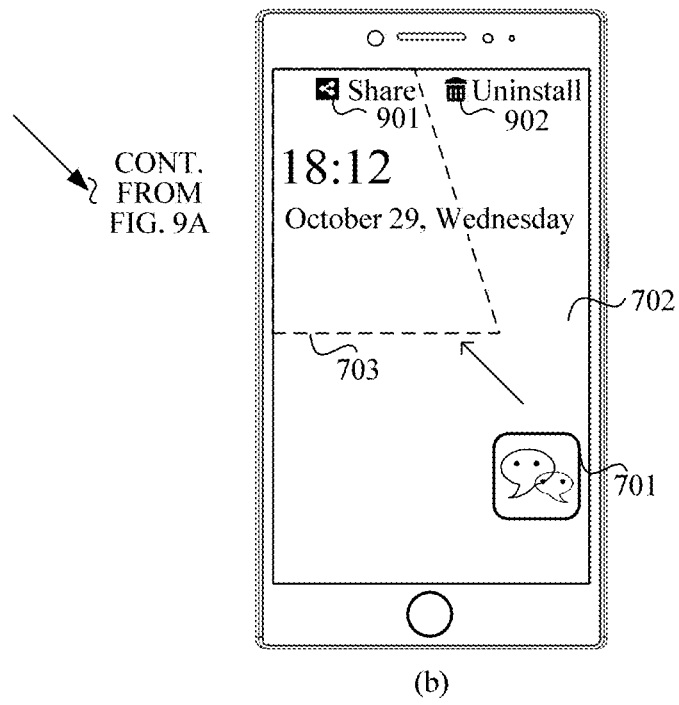

Then, as shown in (a) of FIG. 9B, when the icon of the WeChat application 701 is also close to the left side of the desktop 702, the terminal A may set an area on the desktop 702 in the upper left corner (for example, an area whose size is ¼ of a size of the desktop 702) as the sharing area 703. Subsequently, when the user drags the icon of the WeChat application 701 into the sharing area 703, the terminal A may be triggered to display the terminal found by searching as the sharing peer 704 in the sharing area 703.

Correspondingly, as shown in (b) of FIG. 9B, when the icon of the WeChat application 701 is close to the right side of the desktop 702, if the sharing area 703 is still located in the upper left corner of the desktop 702 and the size is ¼ of the size of the desktop 702, the user may easily enter a preset area to trigger the "Uninstall 902" function while dragging the icon of the WeChat application 701 to move to the sharing area 703. Therefore, as shown in (b) of FIG. 9B, in this case, the terminal A may set the sharing area 703 as a right-angled trapezoid whose bottom side near the icon of the WeChat application 701 is longer.

Certainly, a boundary line of the sharing area 703 may be displayed on the desktop 702 (namely, the first screen), or may be hidden in the desktop 702 (namely, the first screen). Alternatively, when the terminal A detects that the user drags the icon of the WeChat application 701 into the sharing area 703, the boundary line of the sharing area 703 may be displayed, or the terminal A may show another prompt, such as a voice or text prompt, to prompt that the user has entered the sharing area 703. This embodiment of this application does not impose any limitation on this.

In other words, the foregoing step S603 may further include two sub-steps S603*a* and S603*b*.

S603*a*. In response to the first gesture, the terminal A displays on the first screen an indication of performing a sharing operation.

The indication of performing the sharing operation may be specifically prompting, in a form of highlighting, voice, or text, the user to move the to-be-shared file to the sharing area 703, for example, by displaying the boundary line of the sharing area 703.

S603*b*. When detecting that the location of the to-be-shared file meets a preset condition, the terminal A displays the at least one sharing peer of the to-be-shared file in the preset area on the first screen, where the sharing peer is a terminal or a user that supports receiving of the to-be-shared file.

For example, the foregoing preset condition may be that the to-be-shared file is dragged into the sharing area 703 or the user performs a specific gesture on the to-be-shared file, or the like. This embodiment of this application does not impose any limitation on this.

In addition to the foregoing touch and hold gesture and the drag gesture, the first gesture for triggering the terminal A to enable the file sharing function may be one or more of a double-tap gesture, a swipe gesture, a pressure recognition gesture, an area change gesture, a hover gesture, and the like.

For example, when detecting that a user's finger touches the icon of the WeChat application 701, the terminal A may obtain a pressure value of the user's finger pressing the touchscreen. When the obtained pressure value reaches a preset pressure threshold, the terminal A may recognize the touch gesture as a pressure recognition gesture. In this case, the terminal A may display the boundary line of the sharing area 703, and prompt the user to move the icon of the WeChat application 701 into the sharing area 703 for sharing. Then, without leaving the touchscreen, the user's finger may further drag the icon of the WeChat application 701 to the sharing area 703, triggering the terminal A to search for and display the sharing peer 704.

For another example, when detecting that a user's finger touches the icon of the WeChat application 701, the terminal A may obtain a contact area of the user's finger with the touchscreen. When the obtained contact area reaches a preset area threshold, the terminal A may recognize the touch gesture as an area change gesture. At this point, the terminal A may search for a nearby terminal by using Bluetooth or the like, and display the terminal found by searching as the sharing peer 704 in the sharing area 703 for the user to select.

Figure 10:
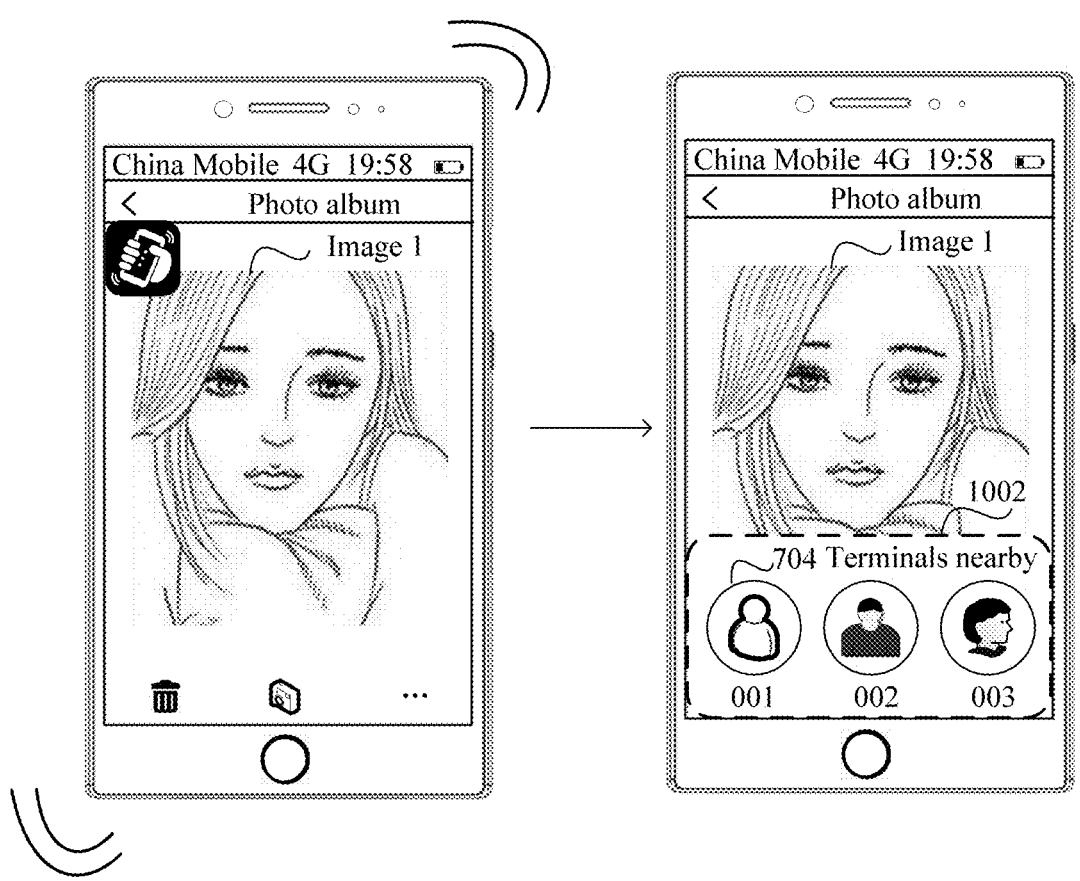
FIG. 10 is a schematic diagram 6 of an application scenario of a file sharing method according to an embodiment of this application.

In some other embodiments of this application, the first gesture may also be a gesture that requires to be recognized by an acceleration sensor, such as shaking or flipping. The shaking gesture is used as an example. As shown in FIG. 10, after enabling a photo album application, the user views an image 1. In this case, the first screen displayed by the terminal A is an image browsing screen 1001 including the image 1. Then, if the terminal A detects that the user performs the shaking gesture, the terminal A may be triggered to search for nearby terminals, and the terminal found by searching is displayed as the sharing peer 704 in a preset area 1002 of the image browsing screen 1001.

S604. The terminal A receives a second gesture that the user drags the to-be-shared file to a first hot zone, where the first hot zone is a hot zone of a target sharing peer of the at least one sharing peer.

S605. In response to the second gesture, the terminal A sends the to-be-shared file to the terminal B on which the target sharing peer is located.

In the steps S604 and S605, after the terminal A displays the at least one sharing peer in the preset area, the user may drag the to-be-shared file, and move the to-be-shared file to the hot zone of the desired target sharing peer (such as an icon of the target sharing peer). At this point, the terminal A may identify that an intention of the user to perform the second gesture is: sharing the to-be-shared file to the target sharing peer. Then, in response to the second gesture, the terminal A may send the to-be-shared file to the terminal B on which the target sharing peer is located through a given transmission mode (for example, the foregoing P2P transmission).

Figure 11:
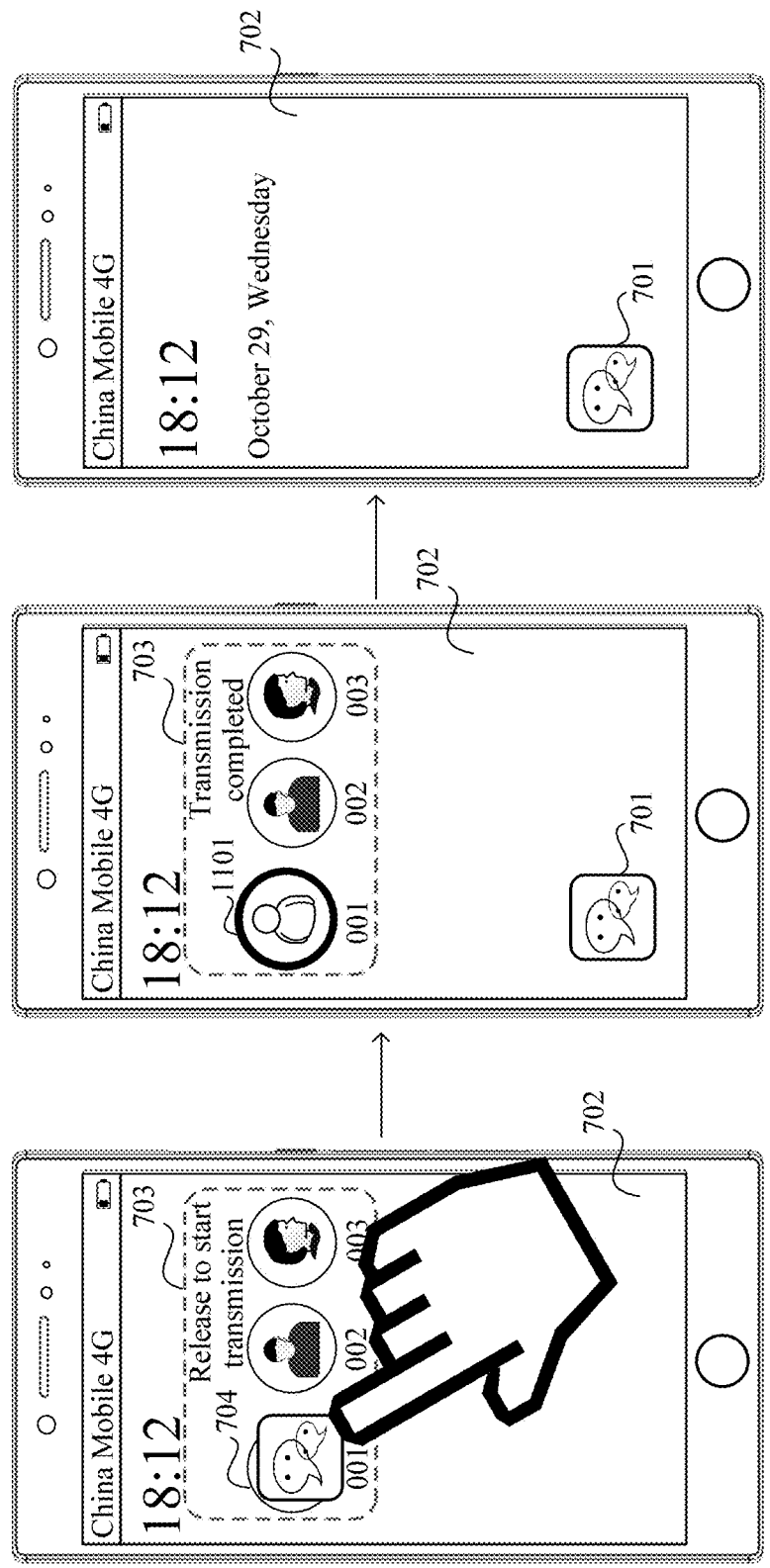
FIG. 11 is a schematic diagram 7 of an application scenario of a file sharing method according to an embodiment of this application.

For example, the WeChat application 701 is used again as the to-be-shared file. As shown in FIG. 11, the terminal A displays the four sharing peers 704 found by searching in the sharing area 703. At this point, if the terminal A detects that the user drags the icon of the WeChat application 701 onto the target sharing peer named "001" and releases the finger, the terminal A may use the P2P transmission mode by default to send the WeChat application 701 to the terminal B named "001".

It can be seen that, in the process in which the terminal A sends the WeChat application 701 to the terminal B, the user's finger does not need to leave the touchscreen, and the terminal A does not switch to or show the new screen, to complete a series of operations including selecting a to-be-shared file, selecting a sharing peer, and transmitting the to-be-shared file on the terminal A, implement the function of file sharing in one step.

Further, in the process in which the terminal A sends the WeChat application 701 to the terminal B, still as shown in FIG. 11, a transmission progress 1101 of transmitting the WeChat application 701 may be displayed in real time on the target sharing peer "001". After the terminal A successfully transmits the WeChat application 701 to the terminal B, the terminal A may automatically hide displayed content in the sharing area 703 to restore the desktop 702, to prevent the sharing area 703 from occluding displayed content on the desktop 702 for a long time.

Figure 12A:
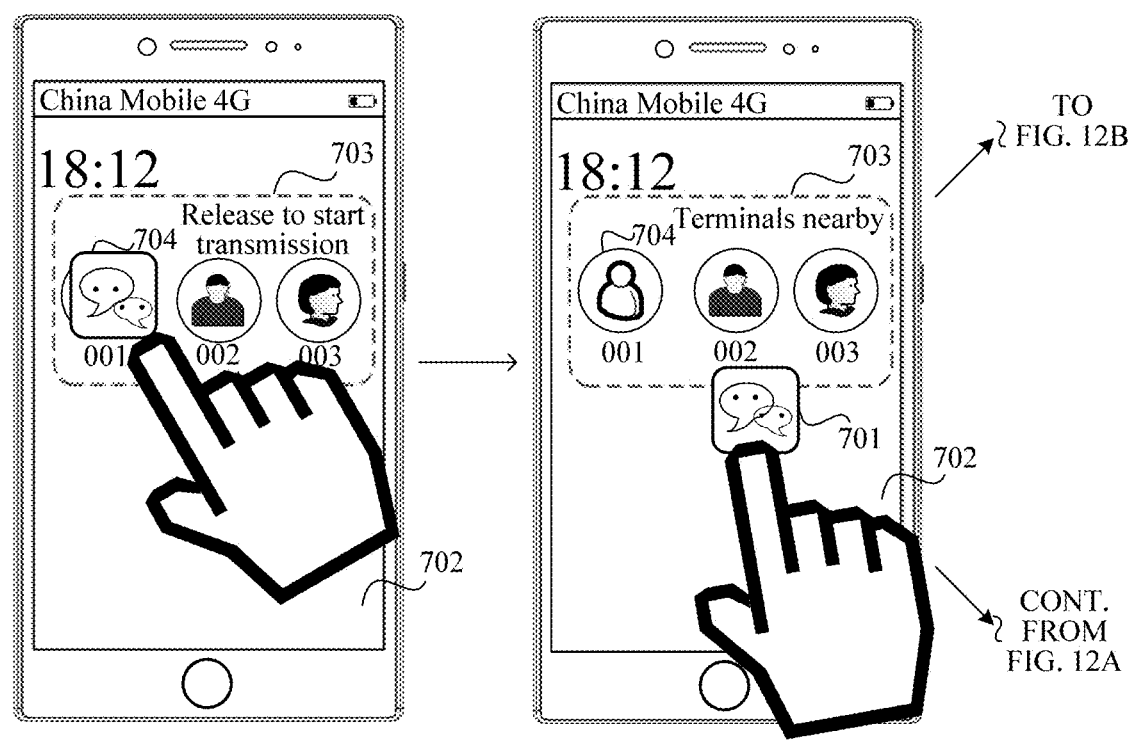
FIG. 12A and FIG. 12B are a schematic diagram 8 of an application scenario of a file sharing method according to an embodiment of this application.
Figure 12B:
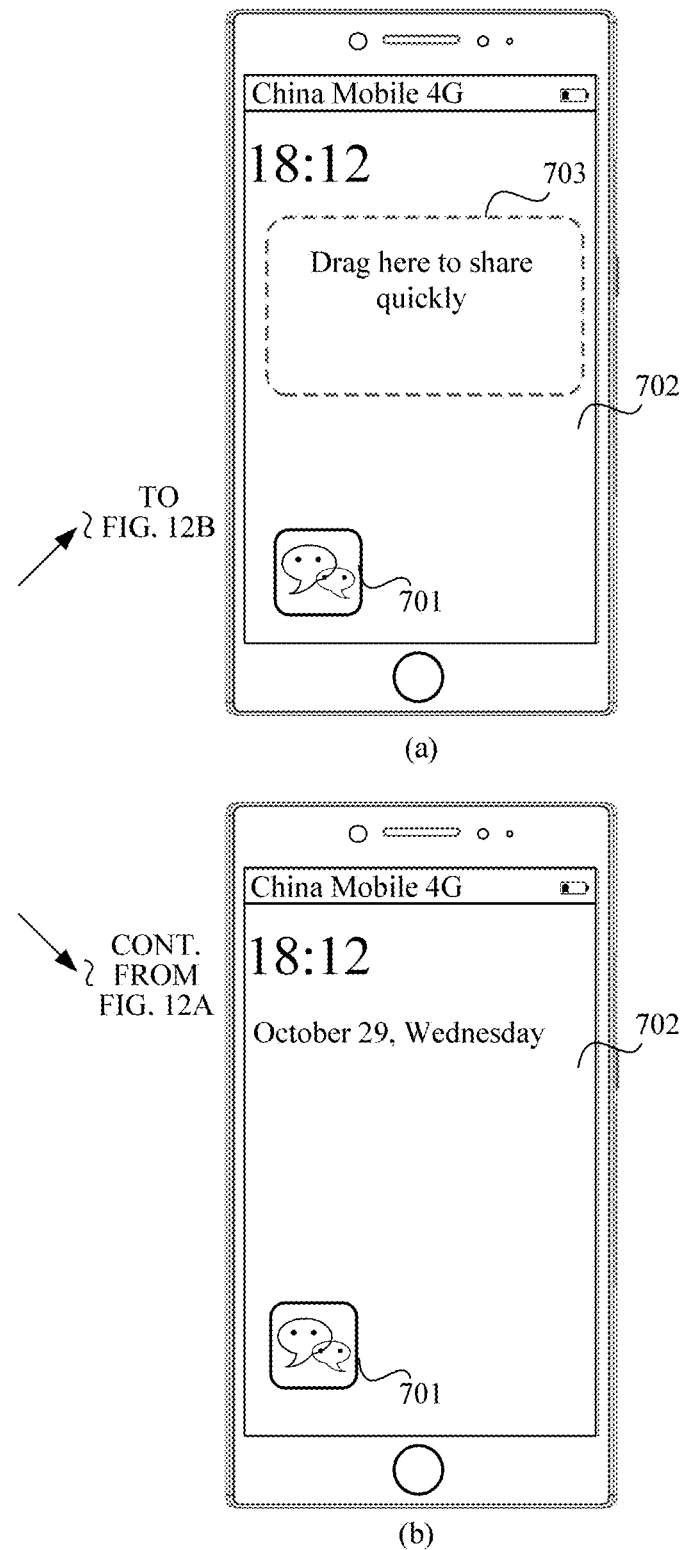

Alternatively, after the terminal A displays the four sharing peers 704 found by searching in the sharing area 703, as shown in FIG. 12A and FIG. 12B, if it is detected that the user drags the icon of the WeChat application 701 to leave the sharing area 703, displayed content in the sharing area 703 may also be automatically hidden.

For example, as shown in (a) of FIG. 12B, the terminal A may stop displaying the sharing peer 704 found by searching in the sharing area 703, but at this point, the terminal A still retains a quick sharing function of the sharing area 703. In this way, if the terminal A detects that the user drags the icon of the WeChat application 701 into the sharing area 703 again, the terminal A may be triggered to re-search for the nearby terminals, and a terminal found by searching is displayed as a new sharing peer in the sharing area 703.

Alternatively, as shown in (b) of FIG. 12B, the terminal A may also stop displaying all displayed content in the sharing area 703. If the user needs to trigger the terminal A to enable the quick sharing function again, the step S601 to S605 may be performed another time.

Alternatively, after the terminal A displays the four sharing peers 704 found by searching in the sharing area 703, if a user's gesture is not detected within a preset time, or a gesture that the user drags the icon of the WeChat application 701 to any sharing peer is not detected, the terminal A may also automatically hide displayed content in the sharing area 703.

Figure 13:
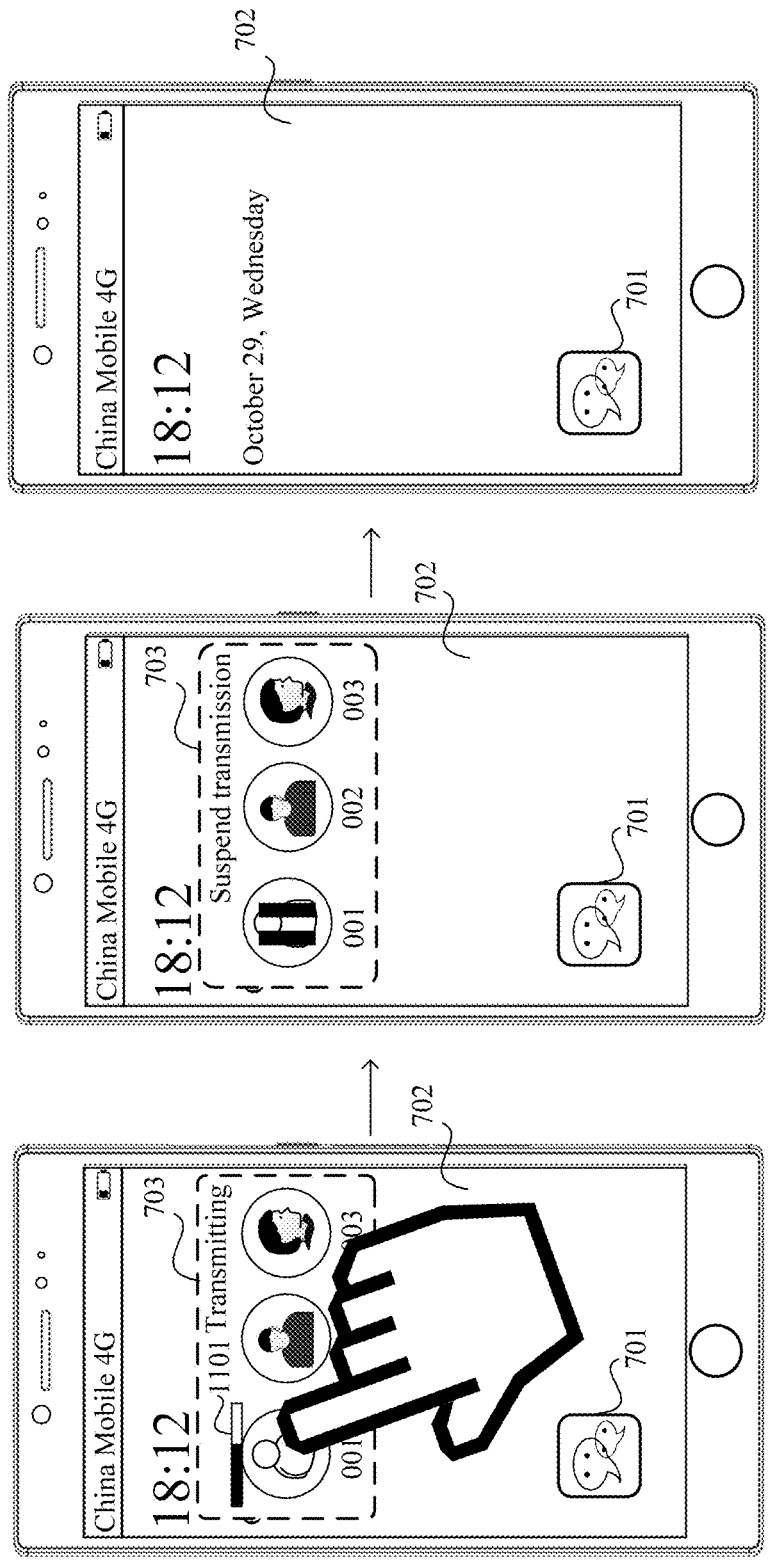
FIG. 13 is a schematic diagram 9 of an application scenario of a file sharing method according to an embodiment of this application.

In addition, in the process of sending the WeChat application 701 to the terminal B on which the target sharing peer is located, as shown in FIG. 13, the user may also suspend or cancel the sharing of the WeChat application 701 to the target sharing peer by tapping the target sharing peer or the like. After the terminal A suspends or cancels the sharing of the WeChat application 701 to the target sharing peer, if the terminal A does not receive an operation of the user on the sharing area 703 within a given period of time, the displayed content in the sharing area 703 may be automatically hidden.

It should be noted that in the file sharing process shown in FIG. 11 to FIG. 13, an example is used in which the terminal A uses a transmission mode by default to send a to-be-shared file. It can be understood that when a user drags the to-be-shared file to the target sharing peer, the terminal A may further provide the user with an optional transmission mode for sending the to-be-shared file. In this implementation, the terminal A may perform the following steps S606 to S608 after the foregoing step S604.

S606. In response to the second gesture, the terminal A displays at least one candidate transmission mode that supports sharing of the to-be-shared file.

Specifically, the candidate transmission mode may specifically include at least one of Bluetooth transmission, WLAN transmission, NFC transmission, and transmission by using a third-party application.

Figure 14:
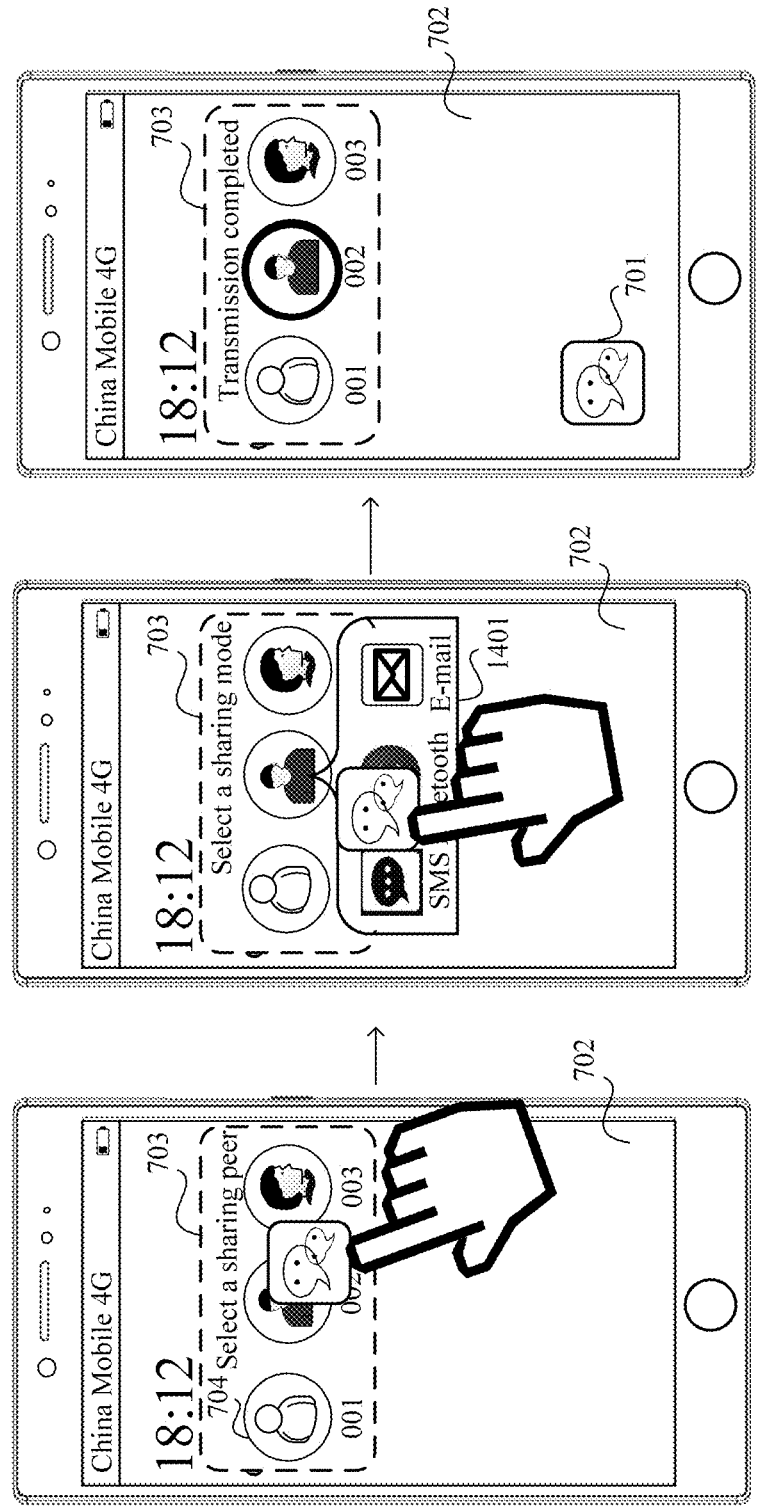
FIG. 14 is a schematic diagram 10 of an application scenario of a file sharing method according to an embodiment of this application.

For example, the WeChat application 701 is used again as the to-be-shared file. As shown in FIG. 14, after the terminal A displays the four sharing peers 704 found by searching in the sharing area 703, if the terminal A detects that the user drags the icon of the WeChat application 701 onto the target sharing peer named "002", the terminal A may display, on the desktop 702 in a form of a secondary menu 1401, a plurality of candidate transmission modes that support transmission of the WeChat application 701.

It should be noted that when the terminal A is triggered to perform the foregoing step S605, S605 may be performed when it is detected that the user's finger drags the WeChat application 701 onto the target sharing peer and releases the WeChat application 701; and when the terminal A is triggered to perform the foregoing step S606, step S606 may be performed when it is detected that the user's finger drags the WeChat application 701 to the target sharing peer. In this case, the user's finger does not need to leave the touchscreen, and the terminal A does not switch to or show the new screen, to provide the user with the available candidate transmission modes when sharing the to-be-shared file.

Certainly, the terminal may alternatively perform the foregoing steps S605 or S606 after detecting that the user's finger drags the WeChat application 701 onto the target sharing peer and stays for a preset time. This embodiment of this application does not impose any limitation on this.

In addition, similar to step S605, if it is not detected that the user selects a desired target transmission mode of the terminal A from the candidate transmission modes within a given period of time, the terminal A may automatically hide the secondary menu 1401, or automatically hide the displayed content in the sharing area 703.

S607. The terminal A receives a third gesture that the user drags the to-be-shared file to a second hot zone, where the second hot zone is a hot zone of the target transmission mode of the at least one candidate transmission mode.

S608. In response to the third gesture, the terminal A sends the to-be-shared file to the terminal B on which the target sharing peer is located by using the target transmission mode.

Similar to the foregoing steps S604 and S605, in steps S607 and S608, still as shown in FIG. 14, after the terminal A displays the plurality of candidate transmission modes in the secondary menu 1401, the user may continue to drag the to-be-shared file to move to the hot zone of the target transmission mode required by the user (such as an icon of the target transmission mode) and release the to-be-shared file. At this point, the terminal A may identify that an intention of the user to perform the third gesture is specifically: sharing the WeChat application 701 to the target sharing peer by using the target transmission mode. Then, the terminal A may send the WeChat application 701 to the terminal B on which the target sharing peer is located by using the target transmission mode.

Similarly, in the process in which the terminal A sends the WeChat application 701 to the terminal B, the user's finger does not need to leave the touchscreen, and the terminal A does not need to switch to or show the new screen, to complete a series of operations including selecting a to-be-shared file, selecting a sharing peer, selecting a transmission mode, and transmitting the to-be-shared file on the terminal A, thereby implementing the function of file sharing in one step.

Figure 15:
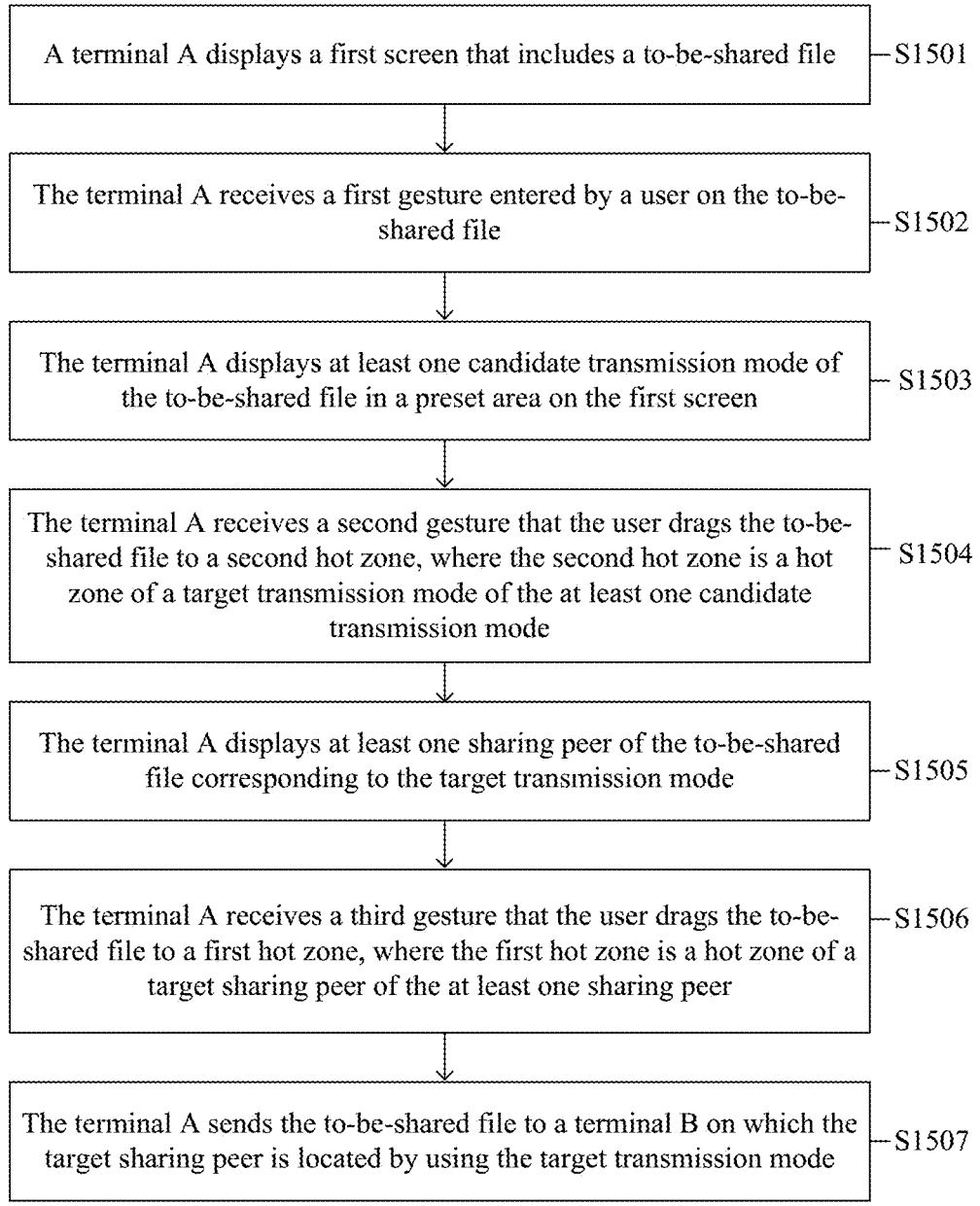
FIG. 15 is a schematic flowchart 2 of a file sharing method according to an embodiment of this application.

In some other embodiments of this application, the user may alternatively first select a transmission mode of the to-be-shared file, and then select a sharing peer that is to share the to-be-shared file to complete the file sharing. In this case, a file sharing method provided in this embodiment of this application is shown in FIG. 15, and includes the following steps.

S1501. A terminal A displays a first screen that includes a to-be-shared file.

S1502. The terminal A receives a first gesture entered by a user on the to-be-shared file.

S1503. In response to the first gesture, the terminal A displays at least one candidate transmission mode of the to-be-shared file in a preset area on the first screen.

For specific implementations of steps S1501 and S1502, refer to the related description of the foregoing steps S601 and S602. Therefore, no further details are provided herein.

In step S1503, the terminal A may be triggered to quickly enable a file sharing function after receiving the first gesture entered by the user on the to-be-shared file on the first screen. At this point, in response to the first gesture, the terminal A does not need to switch to or show a new screen, but displays one or more candidate transmission modes that support transmission of the to-be-shared file in the preset area on the first screen.

Figure 16:
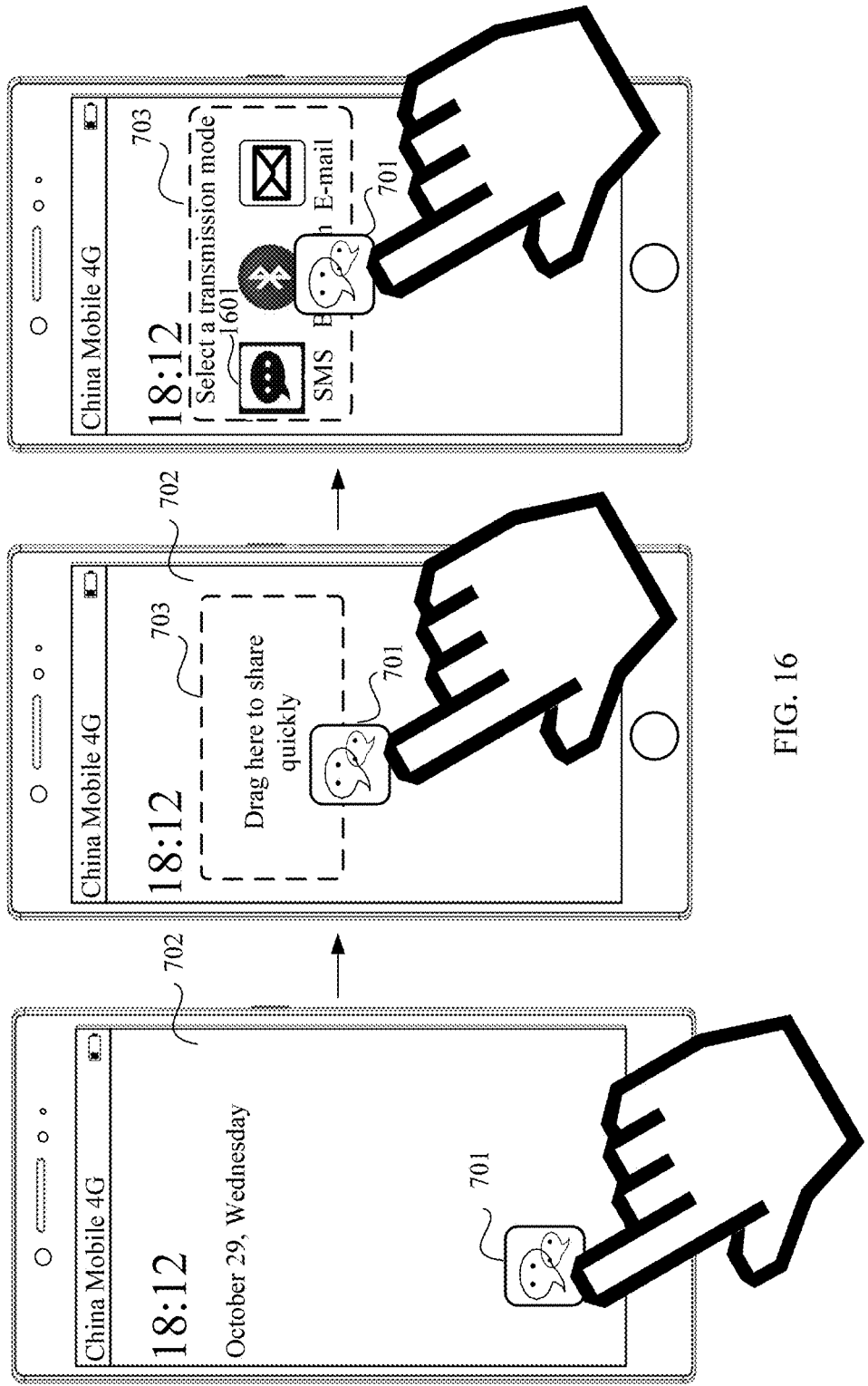
FIG. 16 is a schematic diagram 11 of an application scenario of a file sharing method according to an embodiment of this application.

For example, the WeChat application 701 is used again as the to-be-shared file. As shown in FIG. 16, the desktop 702 displayed by the terminal A includes an icon of the installed WeChat application 701. Then, after the user enters a touch and hold gesture on the icon of the WeChat application 701, the terminal A may be triggered to display a preset sharing area 703 on the desktop 702. When the user drags the icon of the WeChat application 701 to the sharing area 703, the terminal A may identify the intention of the user to share the to-be-shared file, and then the terminal A may be triggered to display a candidate transmission mode 1601 for sharing the WeChat application 701, for example, Bluetooth, SMS, E-mail, and the like, in the sharing area 703 for the user to select.

It should be noted that after the user drags the icon of the WeChat application 701 to the sharing area 703, the finger does not need to leave a touchscreen. After the terminal A displays the candidate transmission mode 1601 for sharing the WeChat application 701 in the sharing area 703, the user may continue to drag the icon of the WeChat application 701 to trigger the terminal to perform the following S1504.

Certainly, the terminal may also display an "Others" option as a candidate transmission mode in the sharing area 703. When the candidate transmission mode displayed by the terminal in the sharing area 703 for the user is not a desired transmission mode of the user, the user may drag the to-be-shared file to the "Others" option and trigger the terminal to display an original sharing frame according to an existing file sharing process, and the user manually selects the sharing peer and the transmission mode to share the to-be-shared file. This embodiment of this application does not impose any limitation on this.

S1504. The terminal A receives a second gesture that the user drags the to-be-shared file to a second hot zone, where the second hot zone is a hot zone of a target transmission mode of the at least one candidate transmission mode.

S1505. In response to the second gesture, the terminal A displays at least one sharing peer of the to-be-shared file corresponding to the target transmission mode, where the sharing peer is a device or a user that supports receiving of the to-be-shared file.

In steps S1504 and S1505, after the terminal displays the at least one candidate transmission mode of the to-be-shared file in the preset area, the user may drag the to-be-shared file, and move the to-be-shared file to the hot zone of the target transmission mode required by the user (for example, an icon of the target transmission mode). At this point, the terminal A may identify that an intention of the user to perform the second gesture is specifically: sharing the to-be-shared file by using the target transmission mode. Then, in response to the second gesture, the terminal A may search for at least one sharing peer around that supports using of the target transmission mode, and then continue to display a secondary menu of the target transmission mode on the first screen, where the secondary menu may include the sharing peer found by searching by the terminal.

Figure 17:
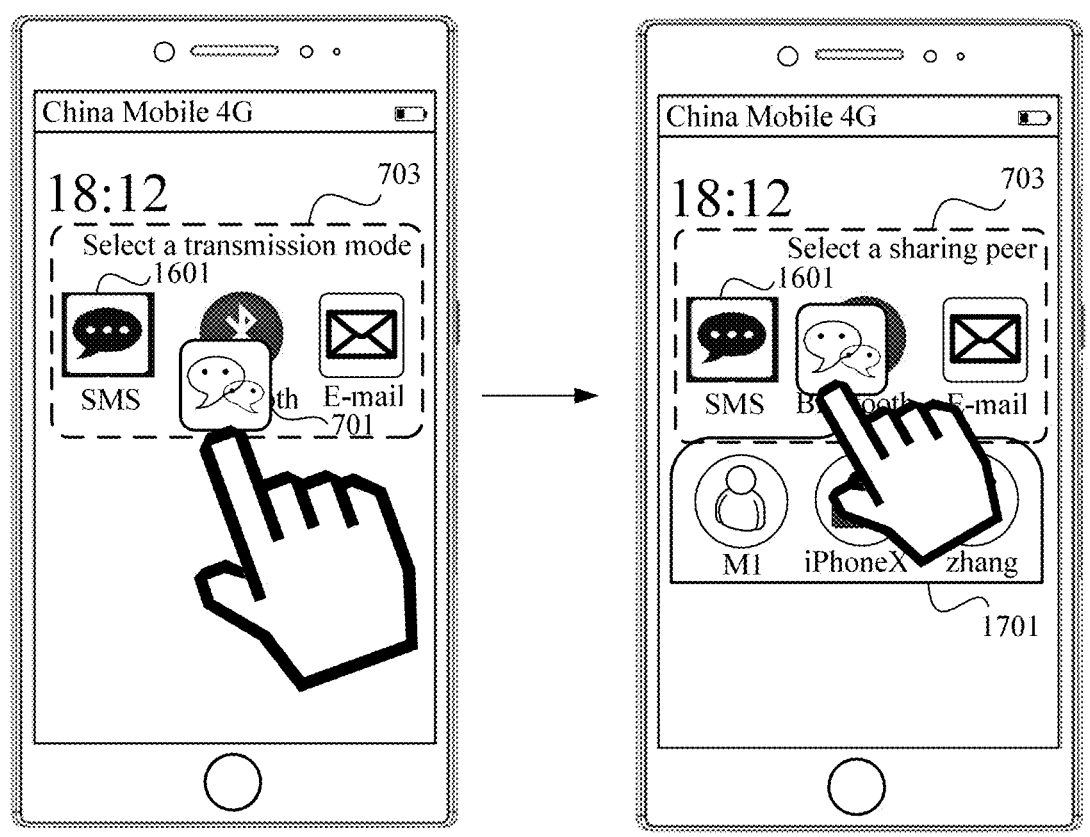
FIG. 17 is a schematic diagram 12 of an application scenario of a file sharing method according to an embodiment of this application.

For example, as shown in FIG. 17, the terminal A displays in the sharing area 703 three candidate transmission modes 1601 for sharing the WeChat application 701: Bluetooth, E-mail, and SMS. Then, if the terminal A detects that the user drags the icon of the WeChat application 701 to the candidate transmission mode 1601 of Bluetooth, the terminal A may use Bluetooth as a target transmission mode of the WeChat application 701, and then the terminal A is triggered to search for at least one sharing peer around via Bluetooth. For example, the terminal A finds three sharing peers named "M1", "iPhone X", and "zhang" by searching. Then, the terminal may display the three sharing peers in the secondary menu 1701 of the target transmission mode of Bluetooth for the user to select.

Similarly, after the user drags the icon of the WeChat application 701 to the target transmission mode, the finger does not need to leave the touchscreen. After the terminal A displays the at least one sharing peer of the to-be-shared file, the user may continue to drag the icon of the WeChat application 701 to trigger the terminal to perform the following step S1506.

S1506. The terminal A receives a third gesture that the user drags the to-be-shared file to a first hot zone, where the first hot zone is a hot zone of a target sharing peer of the at least one sharing peer.

S1507. In response to the third gesture, the terminal A sends the to-be-shared file to a terminal B on which the target sharing peer is located by using the target transmission mode.

In steps S1506 and S1507, after the terminal A displays the at least one sharing peer of the to-be-shared file, the user may continue to drag the to-be-shared file, and move the to-be-shared file to the hot zone of the target sharing peer desired by the user (for example, an icon of the target sharing peer) and release the to-be-shared file. At this point, the terminal A may identify that an intention of the user to perform the third gesture is specifically: sending the to-be-shared file to the target sharing peer by using the target transmission mode. In response to the third gesture, the terminal A may send the to-be-shared file to the terminal B on which the target sharing peer is located by using the target transmission mode.

The second gesture and the third gesture may be different stages of one gesture. For example, both the second gesture and the third gesture are a gesture of dragging an icon, where the second gesture is an operation of dragging the icon to the target sharing peer, and the third gesture is an operation that after the icon is dragged to the target sharing peer, the icon continues to be dragged to a transmission mode of the target sharing peer.

Figure 18:
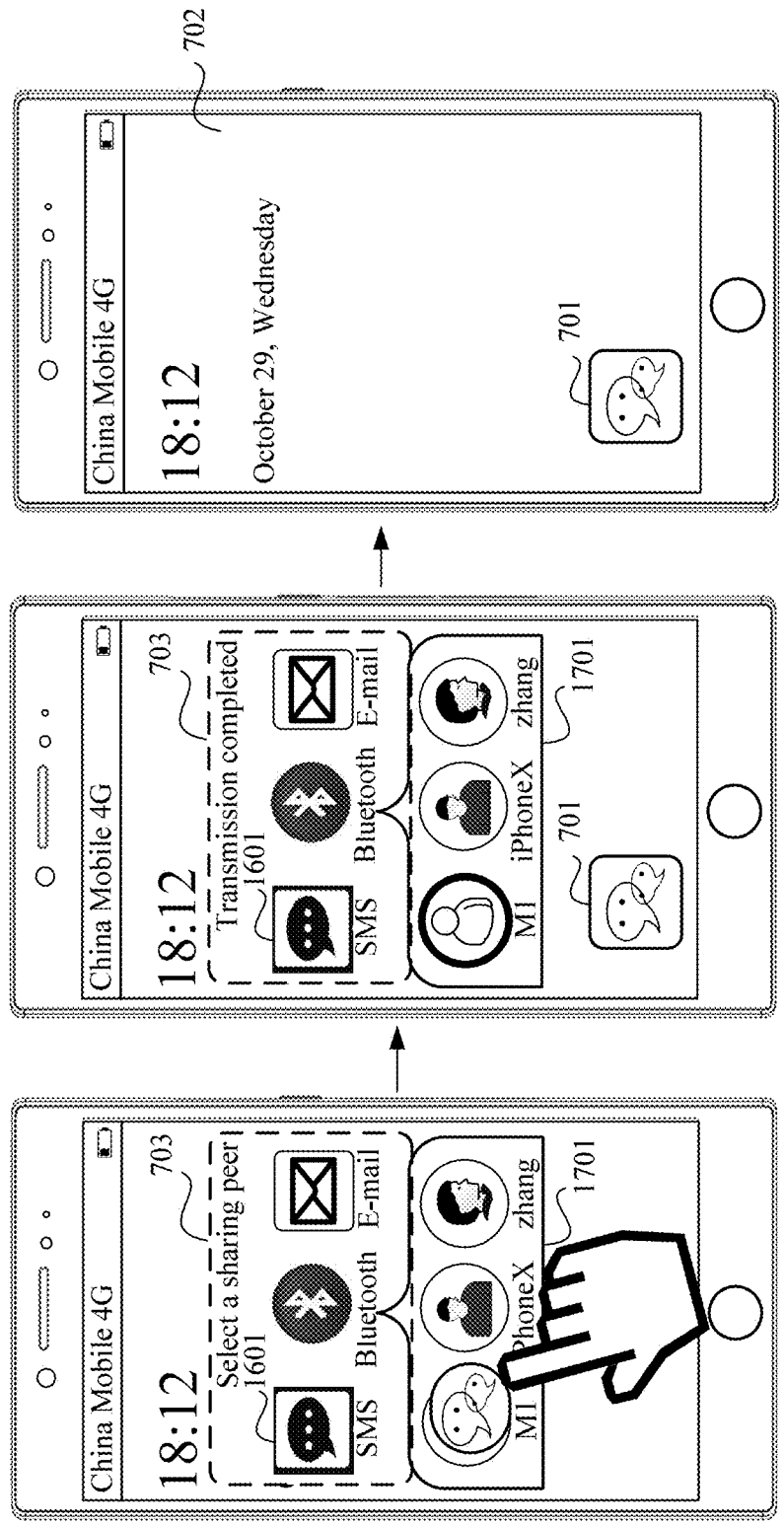
FIG. 18 is a schematic diagram 13 of an application scenario of a file sharing method according to an embodiment of this application.

For example, as shown in FIG. 18, after the terminal displays the sharing peer 1701 on the secondary menu of the target transmission mode of Bluetooth, if the terminal A detects that the user drags the icon of the WeChat application 701 to the target sharing peer named "M1" and releases the finger, the terminal A may send the WeChat application 701 to the terminal B named "M1" by using the target transmission mode (Bluetooth) selected by the user in step S1504, and restore the desktop 702.

It can be seen that, in the entire process in which the terminal A shares the to-be-shared file with the terminal B, the terminal A may identify the sharing intention of the user based on the gesture entered by the user, and display the sharing peer and/or the transmission mode for the user to select when the user needs to share, and automatically hide the sharing peer and/or the transmission mode when the user does not need to share. In this way, when sharing a file, the terminal A does not need to switch between screens to interrupt an operation being performed by the user, nor continue to occupy display space on the current screen to cause occlusion, thereby improving file sharing efficiency between terminals and user experience.

In addition, in the entire process of file sharing, the user's finger does not need to leave the touchscreen, and the terminal does not need to switch from the first screen to another screen to complete a series of operations including selecting a to-be-shared file, selecting a sharing peer, selecting a transmission mode, and transmitting the to-be-shared file on the terminal, thereby implementing the function of file sharing in one step.

It can be understood that, in order to implement the foregoing functions, the foregoing terminal and the like include corresponding hardware structures and/or software modules for performing each function. A person skilled in the art should easily be aware that, units and algorithm steps in the examples described with reference to the embodiments disclosed in this specification can be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of the embodiments of this application.

In the embodiments of this application, the foregoing terminal and the like may be divided into functional modules according to the foregoing method examples. For example, functional modules may be obtained through division in correspondence to functions, or two or more functions may be integrated into one processing module. The integrated module may be implemented in a form of hardware, or may be implemented in a form of a software functional module. It should be noted that, in the embodiments of this application, module division is an example, and is merely logical function division. In actual implementation, another division manner may be used.

Figure 19:
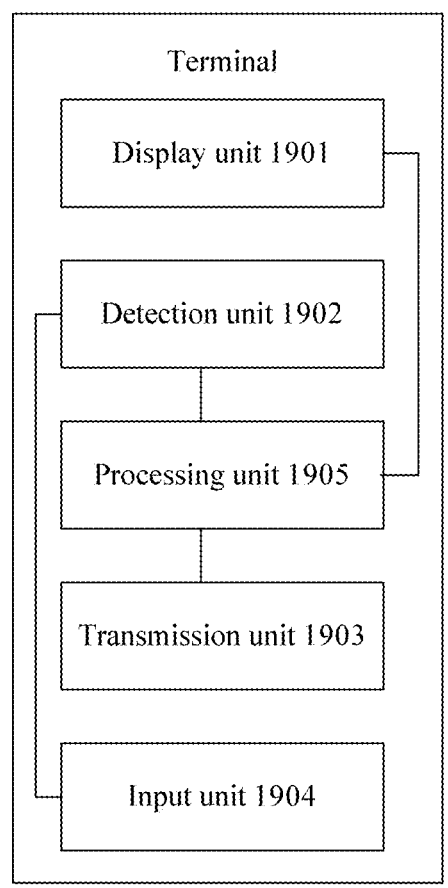
FIG. 19 is a schematic structural diagram 2 of a terminal according to an embodiment of this application.

An embodiment of the present invention further provides a terminal to implement the methods in the foregoing method embodiments. When functional modules obtained through division in correspondence to functions are used, FIG. 19 is a schematic diagram showing a possible structure of the terminal in the foregoing embodiments. The terminal is used to implement the method described in the foregoing method embodiments, and the terminal includes: a display unit 1901, a detection unit 1902, a transmission unit 1903, an input unit 1904, and a processing unit 1905.

The display unit 1901 is configured to support the terminal in performing the processes S601, S603, and S606 in FIG. 6 and the processes S1501, S1503, and S1505 in FIG. 15; the transmission unit 1903 is configured to support the terminal in performing the processes S605 and S608 in FIG. 6 and the process S1507 in FIG. 15; the input unit 1904 is configured to support the terminal in performing the processes S602, S604 and S607 in FIG. 6 and the processes S1502, S1504, and S1506 in FIG. 15; the detection unit 1902 is configured to detect that the to-be-shared file is moved into a preset area on the first screen; and detect that the to-be-shared file is moved into a hot zone of the target sharing peer, where the target sharing peer is one of the at least one sharing peer; and the processing unit 1905 is configured to use an icon of at least one terminal found by searching as the sharing peer; and/or use an icon of at least one contact that has been recently contacted as the sharing peer. All related contents of the steps in the foregoing method embodiments may be cited in function descriptions of corresponding functional modules. Details are not described herein again.

Figure 20:
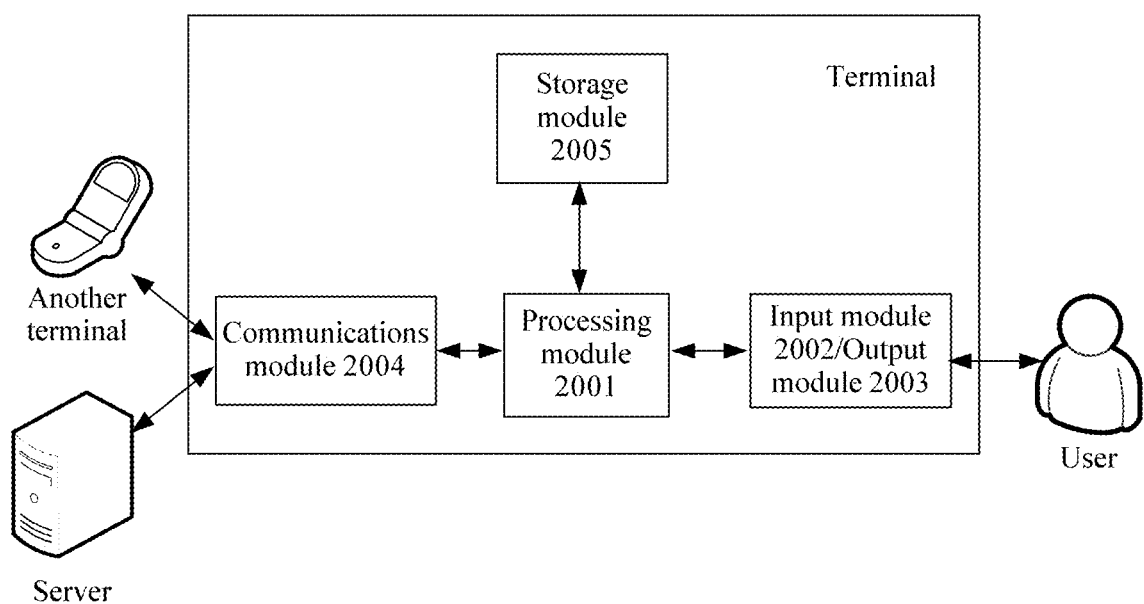
FIG. 20 is a schematic structural diagram 3 of a terminal according to an embodiment of this application.

When an integrated unit is used, the input unit 1904 may be used as an input module, the display unit 1901 may be used as an output module, the detection unit 1902 and the processing unit 1905 may be used as a processing module, and the transmission unit 1903 may be used as a communications module. Certainly, the terminal may further include a storage module. In this case, FIG. 20 is a possible schematic structural diagram of the terminal in the foregoing embodiments.

A processing module 2001 is configured to control and manage actions of the terminal. An input module 2002 and an output module 2003 are configured to support interaction between the terminal and a user. A communications module 2004 is configured to support interaction between the terminal and a server or another terminal. A storage module 2005 is configured to store program code and data of the terminal.

For example, the processing module 2001 may be a processor or a controller, such as a central processing unit (Central Processing Unit, CPU), a GPU, a general-purpose processor, a digital signal processor (Digital Signal Processing, DSP), an application-specific integrated circuit (Application-Specific Integrated Circuit, ASIC), a field programmable gate array (Field Programmable Gate Array, FPGA), or another programmable logic device, a transistor logic device, a hardware component, or any combination thereof. The processor may implement or execute various example logic blocks, modules, and circuits described with reference to content disclosed in this application. Alternatively, the processor may be a combination of processors implementing a computing function, for example, a combination of one or more microprocessors, or a combination of a DSP and a microprocessor.

The storage module 2005 may be a memory. The memory may include a high-speed random access memory (RAM), and may alternatively include a nonvolatile memory such as a magnetic disk storage device, a flash memory device, or another volatile solid state storage device.

The input module 2002 may be a device that receives information entered by a user, such as a touchscreen or a microphone.

The output module 2003 may be a display (as shown in FIG. 3) and another device for displaying information entered by the user, information provided to the user, and various menus of the terminal. Specifically, the display may be configured in a form of a liquid crystal display, an organic light-emitting diode, or the like. In addition, a touch panel may be integrated into the display for collecting touch events on or near the display, and transmitting collected touch information to another component (such as a processor).

The communications module 2004 may be a device that interacts with another terminal or a server, such as a radio frequency circuit, a Bluetooth chip, or a Wi-Fi chip.

In addition, an embodiment of this application further provides an apparatus. The apparatus may be specifically a chip, a component, or a module, and the apparatus may include a processor and a memory that are connected. The memory is configured to store a computer-executable instruction; and when the apparatus is running, the processor may execute the computer-executable instruction stored in the memory to enable the chip to perform the file sharing methods described in the foregoing method embodiments.

All or some of the foregoing embodiments may be implemented by using software, hardware, firmware, or any combination thereof. When a software program is used to implement the embodiments, the embodiments may be implemented completely or partially in a form of a computer program product. The computer program product includes one or more computer instructions. When the computer program instructions are loaded and executed on the computer, the procedure or functions according to the embodiments of this application are all or partially generated. The computer may be a general-purpose computer, a dedicated computer, a computer network, or another programmable apparatus. The computer instruction may be stored in a computer-readable storage medium or may be transmitted from a computer-readable storage medium to another computer-readable storage medium. For example, the computer instruction may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state drive Solid State Drive (SSD)), or the like.

The foregoing descriptions are merely specific implementations of this application, but are not intended to limit the protection scope of this application. Any variation or replacement within application. Therefore, the protection scope of this application shall be subject to the protection the technical scope disclosed in this application shall fall within the protection scope of this scope of the claims.

What is claimed is:

1. A method, comprising:
   displaying, by a terminal, a first screen that comprises a to-be-shared file;
   detecting, by the terminal, a first gesture indicating that the to-be-shared file will be shared;
   in response to detecting the first gesture, prompting a user of a location of a preset area on the first screen, wherein the location of the preset area is not prompted to the user before the first gesture is detected;
   in response to detecting that the to-be-shared file is moved into the preset area on the first screen, searching, by the terminal, for a sharing peer within a device-to-device communication range of the terminal, and displaying, by the terminal, at least one sharing peer of the to-be-shared file found by searching in the preset area, wherein each sharing peer of the at least one sharing peer comprises an icon of a respective device or a respective user that is selectable to receive the to-be-shared file, and the icon of each sharing peer is not displayed until it is detected that the to-be-shared file is moved into the preset area on the first screen; and
   in response to detecting that the to-be-shared file is moved into a hot zone of a target sharing peer, initiating a process of sending, by the terminal, the to-be-shared file to the target sharing peer, wherein the target sharing peer is a sharing peer of the at least one sharing peer.

2. The method according to claim 1, wherein after displaying, by the terminal, the first screen that comprises the to-be-shared file, the method further comprises:
   receiving, by the terminal, a second gesture of a user, the second gesture comprising that the user performs a drag gesture to move the to-be-shared file to the preset area; and
   after displaying, by the terminal, the at least one sharing peer of the to-be-shared file in the preset area, the method further comprises:
   receiving, by the terminal, a third gesture of the user, the third gesture comprising that the user performs a drag gesture to move the to-be-shared file to the hot zone of the target sharing peer; and
   wherein the second gesture and the third gesture are two stages of one continuous gesture.

3. The method according to claim 2, wherein in response to detecting that the to-be-shared file is moved into the hot zone of the target sharing peer, initiating the process of sending, by the terminal, the to-be-shared file to the target sharing peer comprises:
   in response to detecting that the to-be-shared file is moved into the hot zone of the target sharing peer, displaying, by the terminal, at least one candidate transmission mode that supports sharing of the to-be-shared file; and
   in response to detecting that the to-be-shared file is moved into a hot zone of a target transmission mode, initiating a process of sending, by the terminal, the to-be-shared file to the target sharing peer using the target transmission mode, wherein the target transmission mode is a candidate transmission mode of the at least one candidate transmission mode.

4. The method according to claim 3, wherein after displaying, by the terminal, the at least one candidate transmission mode that supports sharing of the to-be-shared file, the method further comprises:
receiving, by the terminal, a fourth gesture of the user, wherein the fourth gesture comprises that the user performs a drag gesture to move the to-be-shared file to the hot zone of the target transmission mode, wherein the fourth gesture, the second gesture, and the third gesture are three stages of one continuous gesture.

5. The method according to claim 1, wherein prompting the user of the location of the preset area on the first screen comprises:
prompting the user a location of the preset area on the first screen by displaying a boundary line of the preset area on the first screen.

6. The method according to claim 1, wherein after initiating the process of sending, by the terminal, the to-be-shared file to the target sharing peer, the method further comprises:
hiding, by the terminal, the preset area to restore the first screen, after the terminal successfully sends the to-be-shared file to the target sharing peer; or
in response to receiving an operation entered by the user to cancel or suspend sending of the to-be-shared file, hiding, by the terminal, the preset area to restore the first screen.

7. The method according to claim 1, wherein after displaying, by the terminal, the at least one sharing peer of the to-be-shared file in the preset area, the method further comprises:
in response to detecting that the user performs a drag gesture to cause the to-be-shared file to leave the preset area, hiding, by the terminal, the preset area to restore the first screen; or
in response to detecting that the user performs a drag gesture to cause the to-be-shared file to leave the preset area, hiding, by the terminal, the at least one sharing peer displayed in the preset area.

8. The method according to claim 1, wherein after initiating the process of sending, by the terminal, the to-be-shared file to the target sharing peer, the method further comprises:
displaying, by the terminal, a transmission progress of sending the to-be-shared file to the target sharing peer.

9. The method according to claim 1, further comprising:
determining, by the terminal, a shape or a size of the preset area based on a start location of the to-be-shared file on the first screen.

10. A method, comprising:
displaying, by a terminal, a first screen that comprises a to-be-shared file;
receiving, by the terminal, a first gesture of a user, wherein the first gesture comprises that the user performs a drag gesture to move the to-be-shared file to a preset area;
in response to detecting that the to-be-shared file is moved into the preset area on the first screen, displaying, by the terminal, a plurality of candidate transmission modes of the to-be-shared file in the preset area;
after displaying, by the terminal, the plurality of candidate transmission modes of the to-be-shared file in the preset area, receiving, by the terminal, a second gesture of the user, wherein the second gesture comprises that the user performs a drag gesture to move the to-be-shared file to a hot zone of a target transmission mode, and wherein the first gesture and the second gesture are two stages of one continuous gesture;
in response to detecting that the to-be-shared file is moved into the hot zone of the target transmission mode, displaying, by the terminal, at least one sharing peer that supports using the target transmission mode, wherein each sharing peer of the at least one sharing peer comprises an icon of a respective device or a respective user that is to receive the to-be-shared file, and the icon of each at least one sharing peer is not displayed before the to-be-shared file is moved into the hot zone of the target transmission mode; and
sharing, by the terminal, the to-be-shared file using the target transmission mode, wherein the target transmission mode is a candidate transmission mode of the plurality of candidate transmission modes.

11. The method according to claim 10, wherein sharing, by the terminal, the to-be-shared file using the target transmission mode comprises:
in response to detecting that the to-be-shared file is moved into a hot zone of a target sharing peer, sending, by the terminal, the to-be-shared file to the target sharing peer using the target transmission mode, wherein the target sharing peer is a sharing peer of the at least one sharing peer.

12. The method according to claim 11, wherein after displaying, by the terminal, the at least one sharing peer that supports using the target transmission mode, the method further comprises:
receiving, by the terminal, a third gesture of the user, wherein the third gesture comprises that the user performs a drag gesture to move the to-be-shared file to the hot zone of the target sharing peer, wherein the third gesture, the first gesture, and the second gesture are three stages of one continuous gesture.

13. A terminal, comprising:
a processor;
a display;
a non-transitory memory;
a bus; and
a communications interface;
wherein the non-transitory memory is configured to store a computer-executable instruction, and the processor is connected to the memory through the bus, and the computer-executable instruction is executable by the processor to cause the terminal to:
display, using the display, a first screen that comprises a to-be-shared file;
detecting a first gesture corresponding to the to-be-shared file, the first gesture corresponding to an instruction to trigger a file sharing process for the to-be-shared file;
in response to detecting the first gesture, determining, by the terminal, a shape or a size of a preset area on the first screen based on a start location of the to-be-shared file on the first screen, wherein the terminal is configured to select different shapes or sizes of the preset area for different start locations of the to-be-shared file on the first screen;
prompting a user of the preset area having the determined shape or size on the first screen;
in response to detecting that the to-be-shared file is moved into the preset area on the first screen, display, using the display, at least one sharing peer of the to-be-shared file in the preset area, wherein each sharing peer of the at least one sharing peer comprises an icon of a respective device or a respective user that is selectable to receive the to-be-shared file; and in response to detecting that the to-be-shared file is moved into a hot zone of a target sharing peer, initiate a process of sending the to-be-shared file to the target sharing peer, wherein the target sharing peer is a sharing peer of the at least one sharing peer.

14. The terminal according to claim 13, wherein the computer-executable instruction is further executable by the processor to cause the terminal to:

after displaying the first screen that comprises the to-be-shared file, receive a first gesture of a user, the first gesture comprising that the user performs a drag gesture to move the to-be-shared file to the preset area; and after displaying the at least one sharing peer of the to-be-shared file in the preset area, receive a second gesture of the user, the second gesture comprising that the user performs a drag gesture to move the to-be-shared file to the hot zone of the target sharing peer; and wherein the first gesture and the second gesture are two stages of one continuous gesture.

15. The terminal according to claim 14, wherein the computer-executable instruction being executable by the processor to cause the terminal to, in response to detecting that the to-be-shared file is moved into the hot zone of the target sharing peer, initiate the process of sending the to-be-shared file to the target sharing peer, comprises the computer-executable instruction being executable by the processor to cause the terminal to:

in response to detecting that the to-be-shared file is moved into the hot zone of the target sharing peer, display, using the display, at least one candidate transmission mode that supports sharing of the to-be-shared file; and in response to detecting that the to-be-shared file is moved into a hot zone of a target transmission mode, initiate a process of sending the to-be-shared file to the target sharing peer using the target transmission mode, wherein the target transmission mode is a candidate transmission mode of the at least one candidate transmission mode.

16. The terminal according to claim 15, wherein the computer-executable instruction is further executable by the processor to cause the terminal to:

receive a third gesture of the user, wherein the third gesture comprises that the user performs a drag gesture to move the to-be-shared file to the hot zone of the target transmission mode, and wherein the third gesture, the first gesture, and the second gesture are three stages of one continuous gesture.

17. The terminal according to claim 13, wherein the computer-executable instruction is executable by the processor to further cause the terminal to:

in response to detecting the first gesture, search for nearby terminals to the terminal, to identify the at least one sharing peer.

* * * * *